(12) United States Patent
Omura et al.

(10) Patent No.: US 9,317,800 B2
(45) Date of Patent: Apr. 19, 2016

(54) NON-CONTACT IC LABEL AND NAMEPLATE

(75) Inventors: Kunio Omura, Tokyo (JP); Hidemi Nakajima, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 272 days.

(21) Appl. No.: 13/817,034

(22) PCT Filed: Aug. 12, 2011

(86) PCT No.: PCT/JP2011/068432
§ 371 (c)(1),
(2), (4) Date: Feb. 14, 2013

(87) PCT Pub. No.: WO2012/023511
PCT Pub. Date: Feb. 23, 2012

(65) Prior Publication Data
US 2013/0140371 A1    Jun. 6, 2013

(30) Foreign Application Priority Data

Aug. 16, 2010  (JP) .................................. 2010-181616
Oct. 12, 2010  (JP) .................................. 2010-229797
May 27, 2011  (JP) .................................. 2011-119293
May 27, 2011  (JP) .................................. 2011-119294

(51) Int. Cl.
*G06K 19/06* (2006.01)
*G08B 13/14* (2006.01)
(Continued)

(52) U.S. Cl.
CPC ...... *G06K 19/07758* (2013.01); *G06K 7/10277* (2013.01); *G06K 19/07771* (2013.01); *G06K 19/07786* (2013.01); *H01Q 1/2225* (2013.01); *H01Q 9/285* (2013.01); *H01Q 21/24* (2013.01)

(58) Field of Classification Search
CPC ................ G06K 19/07771; G06K 19/07773; G06K 19/07786; G06K 19/07758; G06K 19/10277; H01Q 1/2225; H01Q 9/285; H01Q 21/24

USPC ........................................ 235/492; 340/572.7
See application file for complete search history.

(56) References Cited

U.S. PATENT DOCUMENTS

2005/0275539 A1* 12/2005 Sakama et al. ............. 340/572.7
2008/0111695 A1*  5/2008 Yamagajo et al. ......... 340/572.7
2008/0117049 A1*  5/2008 Ogata et al. ................ 340/572.1

FOREIGN PATENT DOCUMENTS

JP       11-85938      3/1999
JP       2000-200328   7/2000
(Continued)

OTHER PUBLICATIONS

Japanese Office Action mailed Aug. 12, 2014 in corresponding Japanese Patent Application No. 2013-117930.
(Continued)

*Primary Examiner* — Laura Gudorf

(57) ABSTRACT

A non-contact IC label includes a magnetic sheet, an IC chip arranged on the magnetic sheet, a first antenna portion including a first connection portion connected to the IC chip and arranged on the magnetic sheet to extend in a first direction from the first connection portion, and a second antenna portion including a second connection portion connected to the IC chip and arranged on the magnetic sheet to extend in a second direction from the second connection portion, wherein each of the first direction and the second direction is along one side of the magnetic sheet, the first direction and the second direction differ from each other, and each of a length of the first antenna portion in a direction perpendicular to the first direction and a length of the second antenna portion in a direction perpendicular to the second direction ranges from 2 mm to 15 mm.

17 Claims, 17 Drawing Sheets

(51) Int. Cl.
*G06K 19/077* (2006.01)
*H01Q 1/22* (2006.01)
*H01Q 9/28* (2006.01)
*H01Q 21/24* (2006.01)
*G06K 7/10* (2006.01)

(56) References Cited

FOREIGN PATENT DOCUMENTS

| JP | 2000200328 A * | 7/2000 | ............. G06K 19/07 |
|----|----------------|--------|--------------------------|
| JP | 2002-525726    | 8/2002 |                          |
| JP | 2004-264983    | 9/2004 |                          |
| JP | 2005-20364     | 1/2005 |                          |
| JP | 2005-244778    | 9/2005 |                          |
| JP | 2005-309811    | 11/2005|                          |
| JP | 2008-187601    | 8/2008 |                          |
| JP | 2008-263354    | 10/2008|                          |
| JP | 2009-151576    | 7/2009 |                          |
| WO | WO 00/16286    | 3/2000 |                          |
| WO | WO 2007/097385 A1 | 8/2007 |                       |

OTHER PUBLICATIONS

International Search Report of Corresponding PCT Application PCT/JP2011/068432 mailed Sep. 13, 2011.

* cited by examiner

NON-CONTACT IC LABEL AND NAMEPLATE

CROSS-REFERENCE TO RELATED APPLICATIONS

This application is a U.S. national stage application of PCT/JP2011/068432 filed Aug. 12, 2011 and claims the foreign priority benefit of Japanese Application No. 2010-181616 filed Aug. 16, 2010, Japanese Application No. 2010-229797 filed Oct. 12, 2010, Japanese Application No. 2011-119293 filed May 27, 2011, and Japanese Application No. 2011-119294 filed on May 27, 2011, in the Japanese Intellectual Property Office, the contents of all of which are incorporated herein by reference.

BACKGROUND OF THE INVENTION

1. Field of the Invention

The present invention relates to a non-contact IC label and a nameplate used in a UHF band and an SHF band.

2. Description of Related Art

Exchange of information using wireless communication has been conventionally performed between an RFID tag (a non-contact IC label) and a reader (a data reading device). However, when this RFID tag is attached to a metallic adherend, communication performance is degraded.

Further, conventionally, an RFID (Radio Frequency IDentification) tag is generally embedded in a body portion of a nameplate configured to be able to communicate with, for example, a data reading device in a non-contact manner. Further, the nameplate cited herein refers to an object in which a brand (specification) is displayed in, for example, a plate. Even when this nameplate is directly attached to the metallic adherend, the communication performance of the RFID tag is degraded.

In order to resolve this problem, configurations of various RFID tags, as will be described hereinafter, have been examined.

For example, in an RFID tag of an electromagnetic induction system using radio waves in a 13.56 MHz band, a magnetic material (a magnetic sheet) with high permeability is provided between an antenna and an adherend to secure a low loss route of magnetic flux between the antenna and the adherend, thus realizing an RFID tag capable of maintaining communication performance even when attached to the metallic adherend. Further, although the communication performance is degraded, the thickness of the magnetic material can be made as small as, for example, 100 μm or less. Accordingly, a thin metal-compliant RFID tag corresponding to the metallic adherend can be produced.

On the other hand, in an RFID tag of a radio wave system used in a UHF band and an SHF band, a method of providing a dielectric or an air layer between an antenna and an adherend to secure a gap between the antenna and the adherend and suppress influence of the adherend is generally used.

However, in this method, when a dielectric having a thickness of approximately 500 μm is used or an air layer having such a thickness is provided between the antenna and the adherend, an interval between the antenna and the adherend is too small. Accordingly, influence of the metallic adherend is strong and communication cannot be performed. Accordingly, at present, it is difficult to produce a thin (500 μm or less thick) RFID tag used in a 13.56 MHz band.

As another RFID tag of a radio wave system used in a UHF band and an SHF band, a configuration in which a magnetic material is provided between an antenna and an adherend is proposed (for example, see Japanese Unexamined Patent Application, First Publication No. 2005-309811). In this RFID tag, a soft magnetic material is arranged between the antenna and the metallic adherend. In Japanese Unexamined Patent Application, First Publication No. 2005-309811, the soft magnetic material is clearly described. On the other hand, there is only a description of a dipole antenna and its modified antenna as the used antenna. Further, even in actual verification, there is no detailed description of a shape of the antenna. Only an example in which a thickness of the magnetic material is 1 mm (the communication distance is 15 mm) is described.

However, in the above-described RFID tag of the radio wave system used in the UHF band and the SHF band, there is a problem in that, for example, when the RFID tag is used as a label, the label is too thick and is not practical.

In a general RFID tag, a width of the antenna is typically 1 mm or less. Further, in some RFID tags, a meander shape with a small antenna width has been adopted for miniaturization and a high antenna gain. It was found from an experiment conducted by the inventor that, when the RFID tag described in Patent Literature 1 above includes the general antenna as described above, sufficient communication performance cannot be obtained simply by making the soft magnetic material thin.

Further, an IC chip used in Patent Literature 1 above and the other non-contact IC label described above has a property of the IC chip being very easily broken because it is formed of monocrystalline silicon. Here, for example, when this non-contact IC label is adhered to a hard adherend (a metallic object such as a car), it is difficult for the adherend to absorb external shock due to sinking or the like. Further, when the thickness of the non-contact IC label is small, a part of the non-contact IC label that absorbs the shock in a thickness direction and buffers against the shock is small. Accordingly, there is a problem in that the IC chip in the non-contact IC label is easily broken due to external stress or shock.

Further, in the above-described RFID tag of the radio wave system used in the UHF band and the SHF band, there is a problem in that, for example, when this RFID tag is embedded in a nameplate, the nameplate is too thick and is not practical. Further, for use as a nameplate, it is desirable for the nameplate to be small in order to make handling easier.

In order to miniaturize the nameplate, an antenna having a width of 1 mm or less is typically used as an antenna of the RFID tag. It was found from the experiment conducted by the inventor that, when the RFID tag described in Patent Literature 1 includes a normal antenna, sufficient communication performance cannot be obtained simply by making the soft magnetic material thin.

The present invention has been made in view of such problems, an object of the present invention is to provide a non-contact IC label and a nameplate having a structure that is used with radio waves of a UHF band and an SHF band, has a thin and small form capable of communication even when attached to a metallic adherend, and is capable of withstanding external stress and impulsive force.

SUMMARY OF THE INVENTION

In order to achieve the object, the present invention adopts the following means.

A non-contact IC label according to an aspect of the present invention includes a magnetic sheet; an IC chip arranged on the magnetic sheet; a first antenna portion including a first connection portion connected to the IC chip and arranged on the magnetic sheet to extend in a first direction from the first connection portion; and a second antenna portion including a second connection portion connected to the IC chip and arranged on the magnetic sheet to extend in a second direction from the second connection portion, wherein each of the first direction and the second direction is along one side of the magnetic sheet, the first direction and the second direction differ from each other, and each of a length of the first antenna portion in a direction perpendicular to the first direction and a length of the second antenna portion in a direction perpendicular to the second direction ranges from 2 mm to 15 mm.

In the non-contact IC label, the thickness of the magnetic sheet may range from 100 µm to 400 µm.

Each of the length of the first antenna portion in the first direction and the length of the second antenna portion in the second direction may range from 20 mm to 40 mm.

In the non-contact IC label, the thickness of the magnetic sheet may be 200 µm or more, and each of the length of the first antenna portion in the direction perpendicular to the first direction and the length of the second antenna portion in the direction perpendicular to the second direction may be 10 mm or more.

In the non-contact IC label, a thickness of the magnetic sheet may range from 300 µm to 600 µm.

In the non-contact IC label, each of the length of the first antenna portion in the direction perpendicular to the first direction and the length of the second antenna portion in the direction perpendicular to the second direction may range from 5 mm to 15 mm.

In the non-contact IC label, each of the length of the first antenna portion in the first direction and the length of the second antenna portion in the second direction may range from 10 mm to 40 mm.

In the non-contact IC label, each of the length of the first antenna portion in the first direction and the length of the second antenna portion in the second direction may range from 20 mm to 40 mm.

In the non-contact IC label, a thickness of the magnetic sheet may be 300 µm or more, and each of the length of the first antenna portion in the direction perpendicular to the first direction and the length of the second antenna portion in the direction perpendicular to the second direction may be 5 mm or more.

In the non-contact IC label, the first direction and the second direction may be opposite to each other.

In the non-contact IC label, the non-contact IC label may perform communication with a data reading device by using a radio wave system as a communication system.

A nameplate according to another aspect of the present invention includes the non-contact IC label; and a sheet-shaped body portion including a first surface having a hole portion formed therein, the hole portion accommodating the non-contact IC label, and a display surface formed in a second surface opposite to the first surface.

In the nameplate, the nameplate may further include a lid portion that is attached to the first surface of the body portion and seals the hole portion in a watertight manner.

In the nameplate, the hole portion may include a main hole portion formed in the first surface of the body portion; and an auxiliary hole portion that may be formed in a bottom portion of the main hole portion and communicates with the main hole portion, and the IC chip may be accommodated within the auxiliary hole portion.

In the nameplate, the nameplate may further include: a protection member that includes a through hole formed to accommodate the IC chip and may be accommodated in the auxiliary hole portion.

In the nameplate, the protection member may be formed in a ring shape, a communicating portion communicating with the through hole and having an opening in an outer peripheral surface of the protection member may be formed in the protection member, and the connection portion may be arranged within the communicating portion.

In the nameplate, an interference prevention hole may be formed in a portion overlapping the protection member in the magnetic sheet when viewed in a thickness direction of the magnetic sheet.

In the nameplate, a radio wave system may be used as a communication system between the non-contact IC label and a data reading device.

A non-contact IC label according to another aspect of the present invention includes: a magnetic sheet having a hole portion formed therein, the hole portion passing through in a thickness direction; a protection member accommodated in the hole portion and including a through hole passing through in the thickness direction; a plurality of antenna portions arranged on the magnetic sheet; and an IC chip connected to the plurality of antenna portions and arranged within the through hole when viewed in the thickness direction.

According to the non-contact IC label, as the protection member is included in the hole portion formed in the magnetic sheet, that is, as the non-contact IC label includes the protection member while maintaining a structure of a so-called thin dipole antenna, external stress and impulsive force acting on the non-contact IC label from the thickness direction acts on the protection member, and a force acting on the IC chip is reduced. Accordingly, even when the non-contact IC label is attached to a metallic adherend, it is possible to maintain a state in which communication can be performed and avoid damage of the IC chip due to the external stress or the impulsive force.

In the non-contact IC label, a thickness in an axis line direction of the protection member may be greater than the thickness in an axis line direction of the IC chip.

According to the non-contact IC label, when external stress or impulsive force acts on the non-contact IC label from the thickness direction, that is, the axis line direction, the IC chip enters the through hole to be completely accommodated in the through hole. Accordingly, the external stress or the impulsive force acts on the protection member. Thus, it is possible to further improve an effect of avoiding damage of the IC chip.

In the non-contact IC label, in the protection member, a communicating portion communicating with the through hole and opened in an outer peripheral surface of the protection member may be formed in the protection member, and a part of a connection portion provided between the plurality of antenna portions and the IC chip may be arranged within the communicating portion when viewed in the axis line direction.

According to the non-contact IC label, as the communicating portion is formed in the protection member, when external stress or impulsive force acts on the protection member from the thickness direction, that is, the axis line direction, the external stress or the impulsive force acts on the protection member and a force acting on the connection portion is reduced. Thus, it is possible to protect the IC chip as well as the connection portion, thus avoiding rupture of the connection portion.

In the non-contact IC label, the communicating portion may include a through portion formed along an axis line direction of the protection member.

According to the non-contact IC label, when external stress or impulsive force acts on the non-contact IC label from the thickness direction, that is, the axis line direction, a part of the connection portion enters the communicating portion to be completely accommodated. Accordingly, the external stress or the impulsive force acts on only the protection member. Thus, it is possible to further improve an effect of avoiding damage of the connection portion.

According to the non-contact IC label of the present invention, the non-contact IC label can perform communication even when the non-contact IC label is attached to the metallic adherend and formed to be thin and small. Further, it is possible to improve durability against external stress and impulsive force. Further, according to the nameplate of the present invention, the nameplate can perform communication even when attached to the metallic adherend and can be formed to be thin and small.

DETAILED DESCRIPTION OF THE INVENTION

First Embodiment

Hereinafter, a non-contact IC label according to a first embodiment of the present invention will be described with reference to FIGS. 1 to 23 and FIGS. 27 to 29. The present non-contact IC label performs communication with a data reading device, which is not shown, in a non-contact manner.

Figure 1:
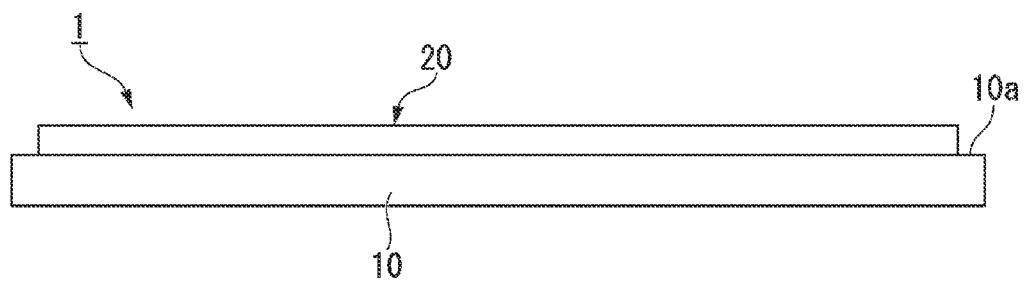
FIG. 1 is a side view schematically illustrating a non-contact IC label according to a first embodiment of the present invention.
Figure 2:
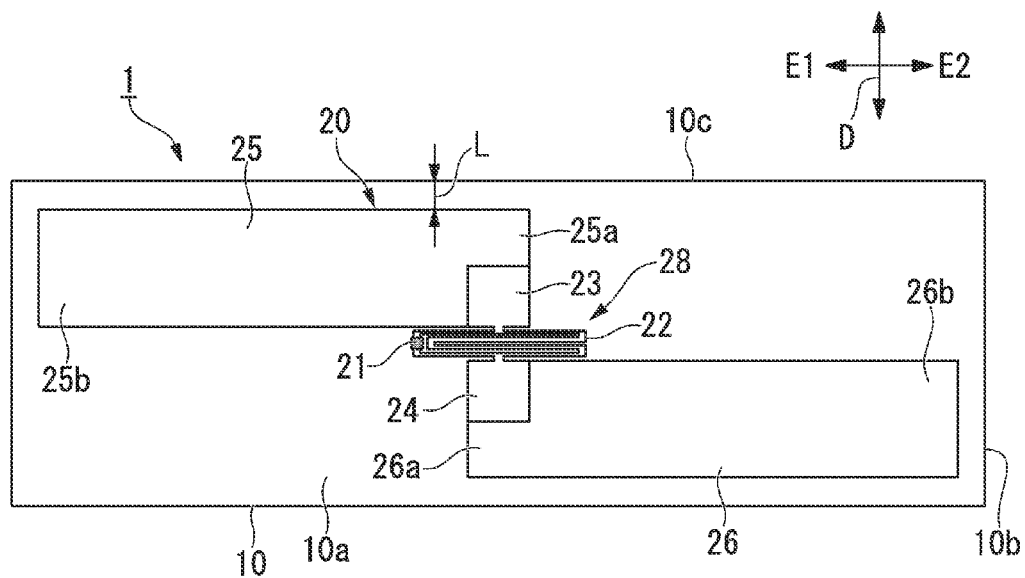
FIG. 2 is a plan view of the non-contact IC label.

As illustrated in FIGS. 1 and 2, the non-contact IC label 1 of the present embodiment includes a magnetic sheet 10, and a communication unit 20 arranged on one surface 10a of the magnetic sheet 10.

A known material which is very flexible for a label and is formed of a compound material of magnetic particles or magnetic flakes and plastic or rubber may be used as the magnetic sheet 10.

As illustrated in FIG. 2, the magnetic sheet 10 may be formed in a rectangular shape in a plan view viewed in a thickness direction of the magnetic sheet 10.

The communication unit 20 is arranged in a center of one surface (a first surface) 10a of the magnetic sheet 10.

The communication unit 20 includes an IC chip 21, a circuit portion 22 connected to the IC chip 21, a pair of connection pads (connection portions) 23 and 24 connected to the circuit portion 22 and arranged to interpose the circuit portion 22 therebetween, a first antenna element (a first antenna portion) 25 connected to the connection pad (a first connection portion) 23, and a second antenna element (a second antenna portion) 26 connected to the connection pad (the second connection portion) 24.

An IC chip having a known configuration is used as the IC chip 21. Predetermined information is stored in the IC chip 21. Also, as energy of radio waves is supplied from an electric junction, which is not shown, provided in the IC chip 21 using a radio wave system, the stored information can be delivered from the electric junction to the outside as radio waves.

In the present embodiment, the circuit portion 22 and the connection pads 23 and 24 are integrally formed with each other by printing silver paste ink on a film, which is not shown, formed of, for example, PET.

The circuit portion 22 is formed of a wiring meandering in a predetermined shape. The circuit portion 22 is configured in such a manner that the same predetermined impedance and the same predetermined resistance value are created between the IC chip 21 and the connection pad 23 and between the IC chip 21 and the connection pad 24. The circuit portion 22 is electrically connected to the electric junction, which is not shown, of the IC chip 21.

The connection pads 23 and 24 are arranged with the circuit portion 22 interposed therebetween in an interposition direction D along the one surface 10a of the magnetic sheet 10, and are electrically connected to the circuit portion 22. The connection pads 23 and 24 are arranged in such a manner that the interposition direction D is in parallel with a side 10b of the magnetic sheet 10.

As described above, the circuit portion 22 and the connection pads 23 and 24 integrally formed with each other, and the IC chip 21 constitute a so-called chip strap 28. Further, the chip strap 28 and the antenna elements 25 and 26 constitute a so-called dipole antenna.

The first antenna element 25 is arranged in such a manner that one end (a first end portion) 25a is electrically connected to the connection pad 23 and the other end (the second end portion) 25b extends in a first direction E1 along the one surface 10a of the magnetic sheet 10 and perpendicular to the interposition direction D. Similarly, the second antenna element 26 is arranged in such a manner that one end (a first end portion) 26a is electrically connected to the connection pad 24 and the other end (a second end portion) 26b extends in a second direction E2 that is a direction opposite to the first direction E1. More specifically, in a plan view when the magnetic sheet 10 is viewed from the one surface 10a, the first antenna element 25 is arranged so that the IC chip 21 is located to the left when the other end 25b is viewed in the first direction E1 from the one end 25a. Similarly, the second antenna element 26 is arranged so that the IC chip 21 is located to the left when the other end 26b is viewed in the second direction E2 from the one end 26a. The antenna elements 25 and 26 are arranged so that the first direction E1 and the second direction E2 are in parallel to a side 10c perpendicular to the side 10b of the magnetic sheet 10.

The first antenna element 25 and the second antenna element 26 are formed in the same rectangular shape in the present embodiment.

The IC chip 21 is electrically connected to the antenna elements 25 and 26 via the circuit portion 22 and the connection pads 23 and 24, and the impedance and the resistance value are adjusted by the circuit portion 22.

This is a modeling of a modified dipole antenna having fewer characteristics in a space, but the antenna elements 25 and 26 appear to be arranged diagonally around the chip strap 28 as described above, which is one characteristic of the present invention.

The non-contact IC label 1 configured as described above can be preferably communicated even when attached to the metallic adherend and can be formed to be thin and small by setting the thickness of the magnetic sheet 10, the length in the first direction E1 of the antenna elements 25 and 26 (hereinafter referred to simply as "length") and the length in the interposition direction D (hereinafter referred to as "width") to be within a predetermined range.

Next, the nameplate of the present embodiment will be described with reference to FIGS. 19 to 23. The present nameplate performs communication with a data reading device, which is not shown, in a non-contact manner.

Figure 19:
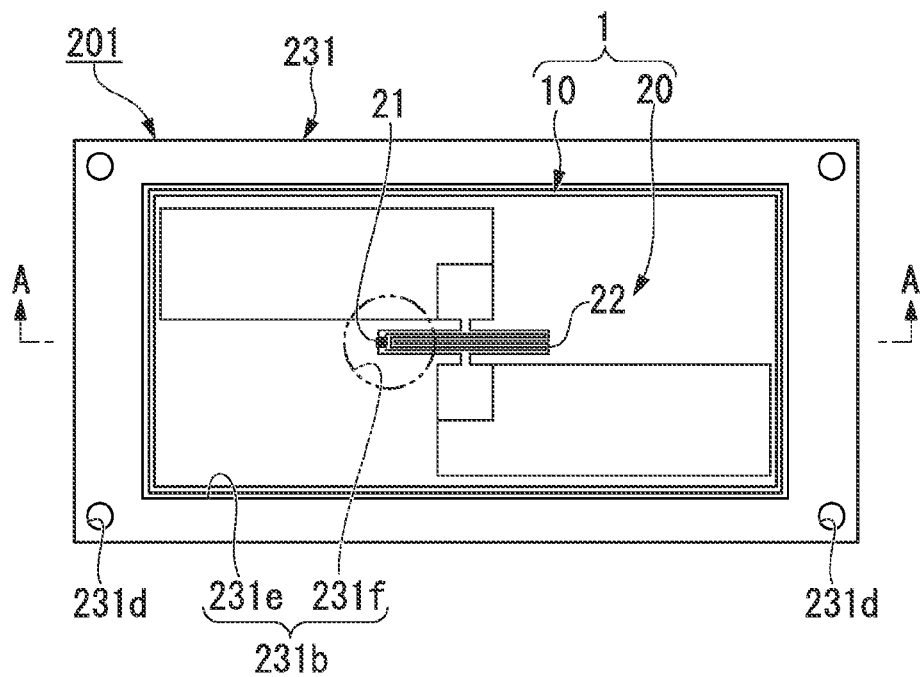
FIG. 19 is a perspective plan view of a nameplate according to the embodiment.
Figure 20:
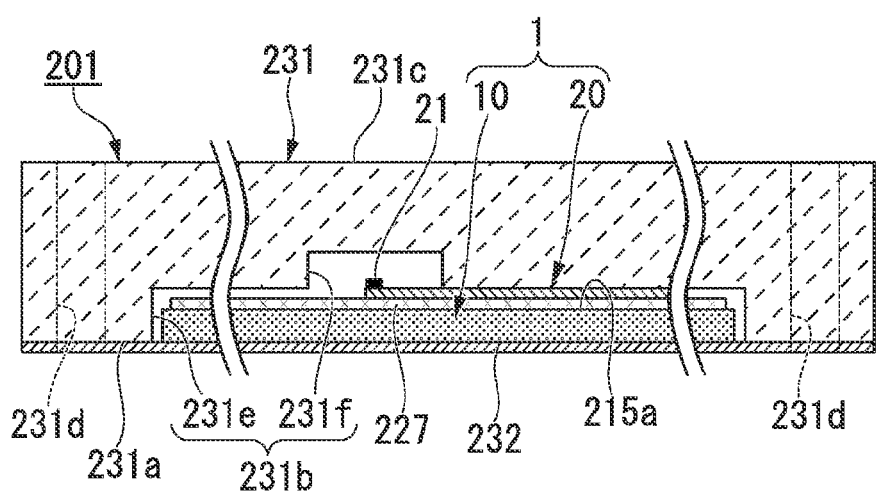
FIG. 20 is cross-sectional view taken along cutting line A-A in FIG. 19.

As illustrated in FIGS. 19 and 20, the nameplate 201 of the present embodiment includes a non-contact IC label 1 capable of communication in a non-contact manner, a sheet-shaped nameplate body (body portion) 231 having a hole portion 231b accommodating the non-contact IC label 1 formed on a first surface 231a, and a sealing layer (lid portion) 232 attached to the first surface 231a and seals the hole portion 231b in a watertight manner.

The nameplate body 231 is formed in a rectangular shape in a plan view when viewed in a thickness direction, and the thickness thereof is set to approximately 1 mm. Attachment holes 231d passing through in a thickness direction are provided at four corners of the nameplate body 231.

The nameplate body 231 is formed of, for example, a resin that is a non-metallic material having a certain strength to avoid communication failure when communication is performed between the non-contact IC label 1 and the data reading device and to prevent cracking when the nameplate body 231 is fixed by caulking, screws, or the like using the attachment holes 231d.

The hole portion 231b includes a hole-portion body 231e formed in the first surface 231a of the nameplate body 231, and an auxiliary hole portion 231f formed in a side of second surface 231c on an opposite side from the first surface 231a of the hole-portion body 231e in the nameplate body 231 and communicating with the hole-portion body 231e.

The auxiliary hole portion 231f is formed in a center portion of the hole-portion body 231e to be smaller than the hole-portion body 231e in a plan view illustrated in FIG. 19.

Figure 21:
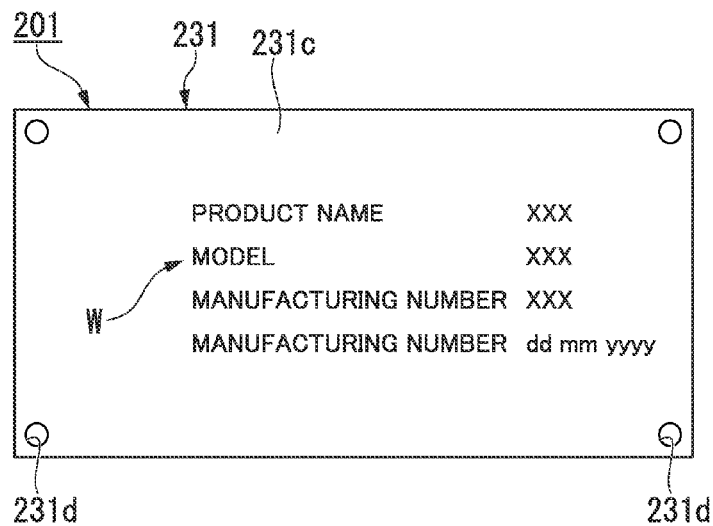
FIG. 21 is a plan view of the nameplate.
Figure 22:
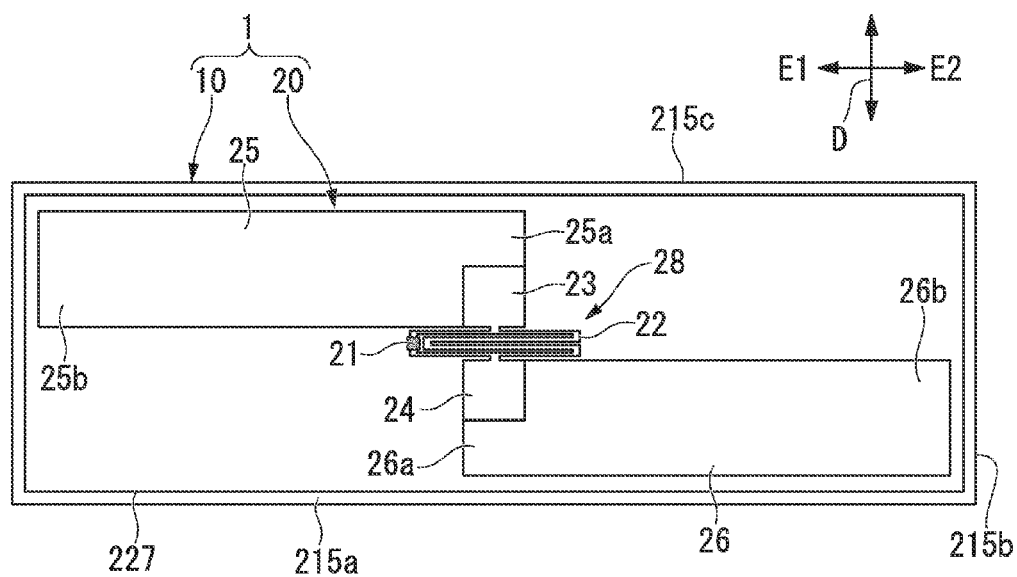
FIG. 22 is a plan view of a communication unit of the nameplate.
Figure 23:
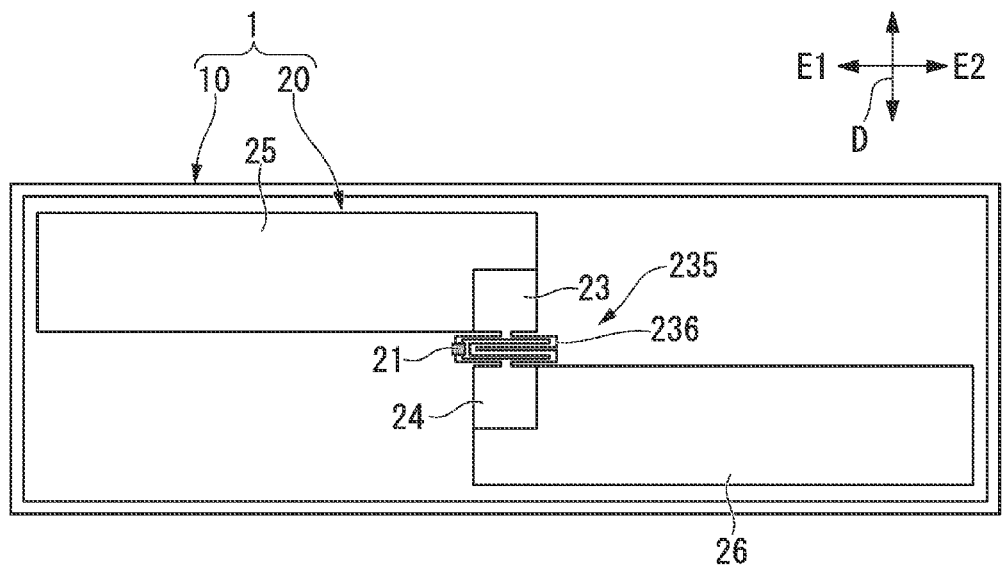
FIG. 23 is a plan view of a communication unit in which impedance of a circuit portion is small according to the embodiment.

As illustrated in FIG. 21, the second surface 231c in the nameplate body 231 is a display surface. A display W indicating a product name, a model, etc. is formed in the second surface 231c. The display W is formed in the second surface 231c of the nameplate body 231 by printing, laser engraving or the like.

As illustrated in FIG. 20, the sealing layer 232 is a layer for preventing liquid, dust, moisture, gas or the like from entering the hole portions 231b of the nameplate body 231. A material of the sealing layer 232 may be any material that has a function of preventing the above-described liquid or the like from entering.

Further, when the nameplate body 231 is fixed to a wall surface or the like by caulking or the like using the attachment holes 231d in a state in which the sealing layer 232 abuts the wall surface or the like, it is possible to further increase an effect of sealing the hole portions 231b of the nameplate body 231 using the sealing layer 232. The IC chip 21 is accommodated in the auxiliary hole portion 231f (see FIG. 20).

In order to examine a range of the thickness of the magnetic sheet 10 and the widths and lengths of the antenna elements 25 and 26 to achieve the above object, an experiment that will be described hereinafter was conducted.

(Experiment 1)

In the experiment, equipment and materials shown below were used.

Magnetic sheet 10: μ sheet (product name) HU02 (200 μm thick) and HU01 (100 μm thick), which is available from Takeuchi Industrial Co. Ltd.

IC chip 21: UCODE G2iL, which is available from NXP Corporation

Antenna elements 25 and 26: Aluminum thin film of having a thickness of 12 μm

Chip strap (with an impedance circuit (circuit portion)): Parts other than the IC chip 21 are available from our company (two types of chip straps having a changed wiring length)

A pattern was printed (8 μm thick) on a film 27 formed of PET (50 μm thick) with silver paste ink A UHF band, high-output handy reader (a data reading device): SAMSUNG VLACG1 maximum output: 1 w Metal plate: Formed of stainless (250 mm×250 mm×0.5 mm)

(1-1 Production of Sample)

For a size of the magnetic sheet 10, a width was 50 mm, a length was 80 mm, and a thickness was changed in three steps: 100 μm, 200 μm and 400 μm. Further, for the magnetic sheet having a thickness of 400 μm, two magnetic sheets each having a thickness of 200 μm were stacked and used. Further, since making the non-contact IC label thin is the object, a magnetic sheet having a thickness exceeding 400 μm was excluded from experiment targets.

For the antenna elements 25 and 26, a width was changed in four steps: 2 mm, 5 mm, 10 mm and 15 mm, and a length was changed in three steps: 20 mm, 30 mm and 40 mm. That is, the width was changed in four steps, the length was changed in three steps, and a total of 12 types of antenna elements 25 and 26 were used. Further, since making the non-contact IC label small is the object, antenna elements having a width exceeding 15 mm, and antenna elements having a length exceeding 40 mm in the antenna elements 25 and 26 were excluded from experiment targets.

The connection pads 23 and 24 had square shapes, one side of which is 5 mm, and an interval in the interposition direction D between the connection pad 23 and the connection pad 24 was 3 mm.

Figure 3:
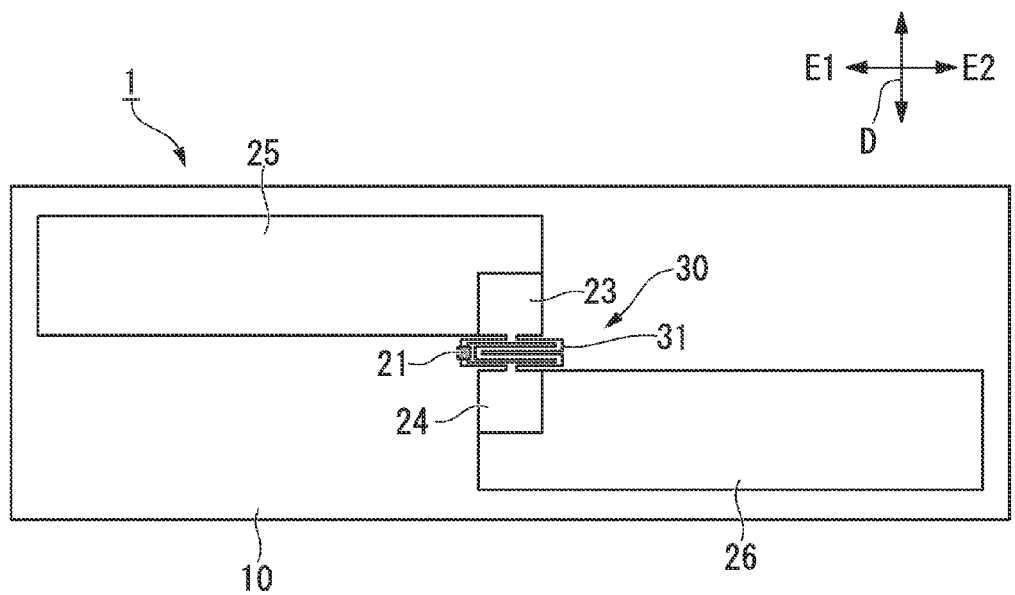
FIG. 3 is a plan view of a non-contact IC label in which impedance of a circuit portion according to the first embodiment is small.

Further, an experiment using a chip strap 30 illustrated in FIG. 3, obtained by partially changing a configuration of the chip strap 28, was conducted. The chip strap 30 included a circuit portion 31 obtained by decreasing the length of the wiring of the circuit portion 22 to make an impedance and a resistance value small, in place of the circuit portion 22 of the chip strap 28.

(1-2 Experiment Procedure)

Figure 4:
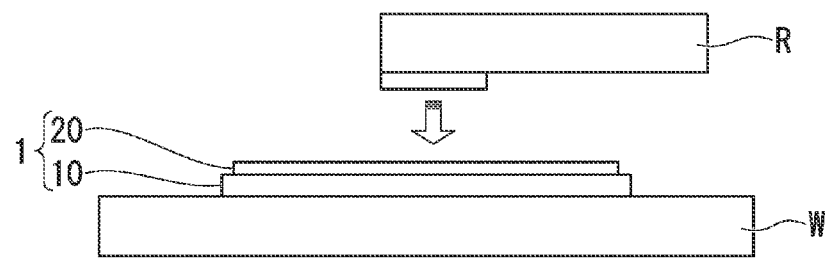
FIG. 4 is a side view illustrating a procedure of an experiment using the non-contact IC label.

As illustrated in FIG. 4, a magnetic sheet 10 having any of the above thicknesses was arranged on a stainless metal plate W. Also, antenna elements 25 and 26 having any of the above widths and lengths were arranged in the positions illustrated in FIG. 2 on the magnetic sheet 10. Further, the chip strap 28 printed on the film 27 was arranged on the magnetic sheet 10 so that the connection pads 23 and 24 were electrically connected to the antenna elements 25 and 26. A styrene foam, which is not shown, was placed on the film 27, and portions from the metal plate W to the styrene foam were collected and fixed using a band so that connection between the antenna elements 25 and 26 and the connection pads 23 and 24 was reliable.

The IC chip 21 was approached by a handy reader R from the styrene foam and the information stored in the IC chip 21 was read using a radio wave system. Also, a maximum value of a distance (communication distance) at which the handy reader R could read information from the communication unit 20 in a non-contact manner was obtained.

Further, it was found that the styrene foam and the PET film hardly affect the measurement result of the communication distance.

When the measurement of one specification ended, the band was removed, the antenna elements 25 and 26 interposed between the magnetic sheet 10 and the film 27 were removed, the antenna elements 25 and 26 having different width or length specifications were interposed between the magnetic sheet 10 and the film 27 and fixed using a band, and measurement was conducted.

The widths of the antenna elements 25 and 26 were changed in four steps of 2 mm, 5 mm, 10 mm and 15 mm, the lengths thereof were changed in three steps of 20 mm, 30 mm and 40 mm, the thickness of the magnetic sheet 10 was changed in three steps of 100 μm, 200 μm and 400 μm, and then the measurement of the communication distance was repeated.

The above UHF band high-output handy reader suitable for reading an item tag including a non-contact IC label was used as the handy reader R. A maximum output of the handy reader R was 1 W, but the handy reader R had a specification in which its output was variable in increments of 1 dB. It was found from a result of a preliminary experiment conducted in advance that, when the thickness of the magnetic sheet 10 was as small as 100 μm, it was difficult for the communication distance to differ according to the length of the antenna element at 0.5 W, which was the output of the handy reader R. Accordingly, in the following experiment, when the thickness of the magnetic sheet 10 was 200 μm and 400 μm, the output was set to 0.5 W (27 dBm), and when the thickness was 100 μm, the output was set to 1 W (30 dBm).

Further, the same experiment was conducted using the chip strap 30 having the circuit portion having a small impedance and resistance value.

(1-3 Results)

Figure 5:
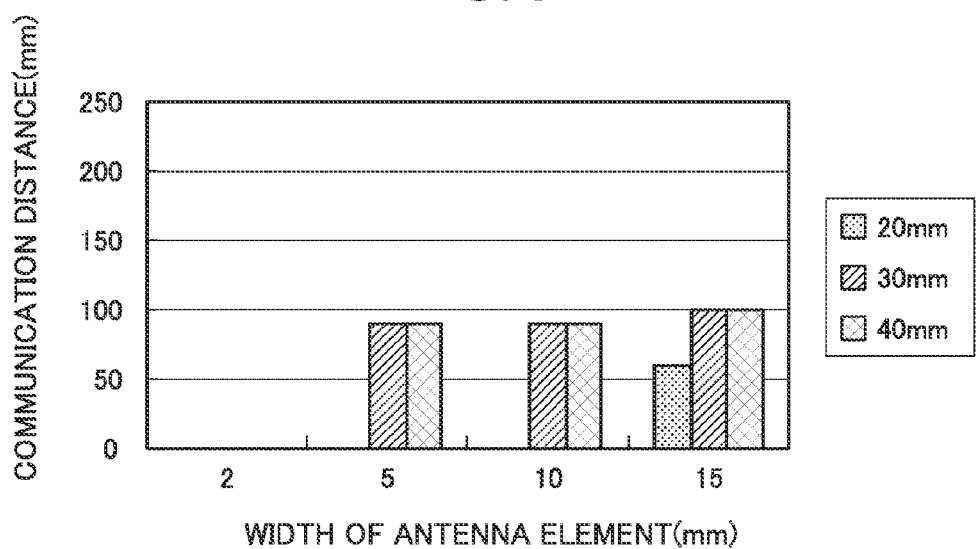
FIG. 5 is a graph illustrating an experiment result when a thickness of a magnetic sheet using a chip strap in which impedance of the circuit portion is great is 100 μm.
Figure 6:
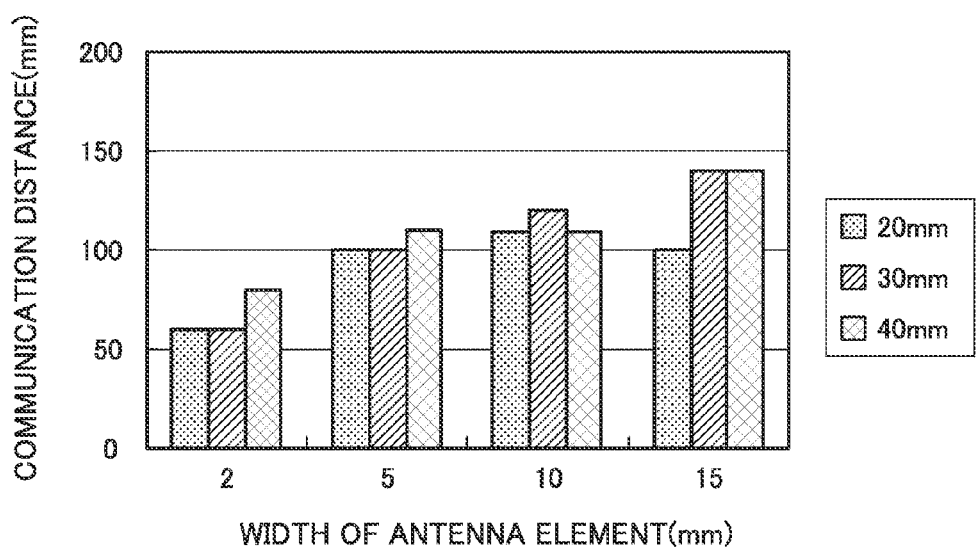
FIG. 6 is a graph illustrating an experiment result when a thickness of a magnetic sheet using a chip strap in which impedance of the circuit portion is great is 200 μm.
Figure 7:
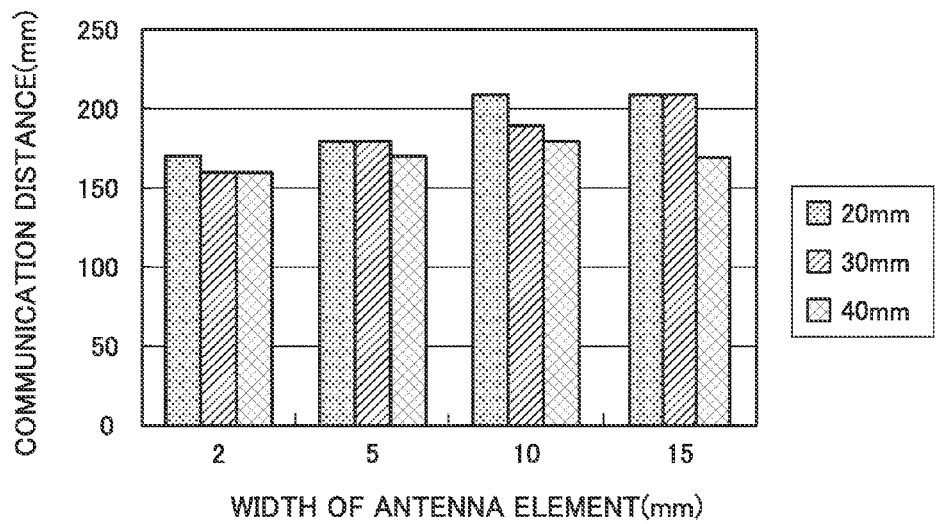
FIG. 7 is a graph illustrating an experiment result when a thickness of a magnetic sheet using a chip strap in which impedance of the circuit portion is great is 400 μm.

Experiment results in which the chip strap 28 having the circuit portion 22 having great impedance and resistance value was used and the thickness of the magnetic sheet 10 was 100 μm, 200 μm and 400 μm are shown in FIGS. 5, 6 and 7, respectively.

In a case illustrated in FIG. 5 in which the thickness of the magnetic sheet 10 was 100 μm, information could not be read by the handy reader R at any experimented lengths of the antenna elements 25 and 26 when the widths of the antenna elements 25 and 26 were 2 mm. Meanwhile, it was found that communication up to a predetermined distance was possible when the widths of the antenna elements 25 and 26 were 5 mm or more and the lengths thereof were 30 mm and 40 mm.

In a case illustrated in FIG. 6 in which the thickness of the magnetic sheet 10 was 200 μm, generally, a tendency for the communication distance to increase as the widths of the antenna elements 25 and 26 increase was confirmed.

In each case illustrated in FIG. 7 in which the thickness of the magnetic sheet 10 was 400 μm, it was found that the communication distance increased as compared with the case in which the thickness of the magnetic sheet 10 was 200 μm. Also, a tendency for the communication distance to increase as the widths of the antenna elements 25 and 26 increased was confirmed slightly. In this case, it was also found that the communication distance when the lengths of the antenna elements 25 and 26 were 40 mm became smaller than the communication distance when the lengths were 20 mm and 30 mm.

Figure 8:
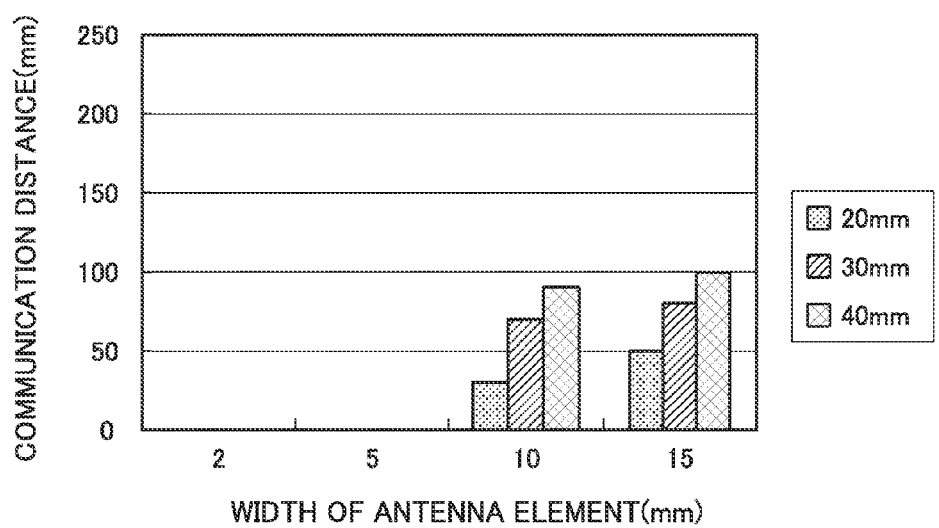
FIG. 8 is a graph illustrating an experiment result when a thickness of a magnetic sheet using a chip strap in which impedance of the circuit portion is small is 100 μm.
Figure 9:
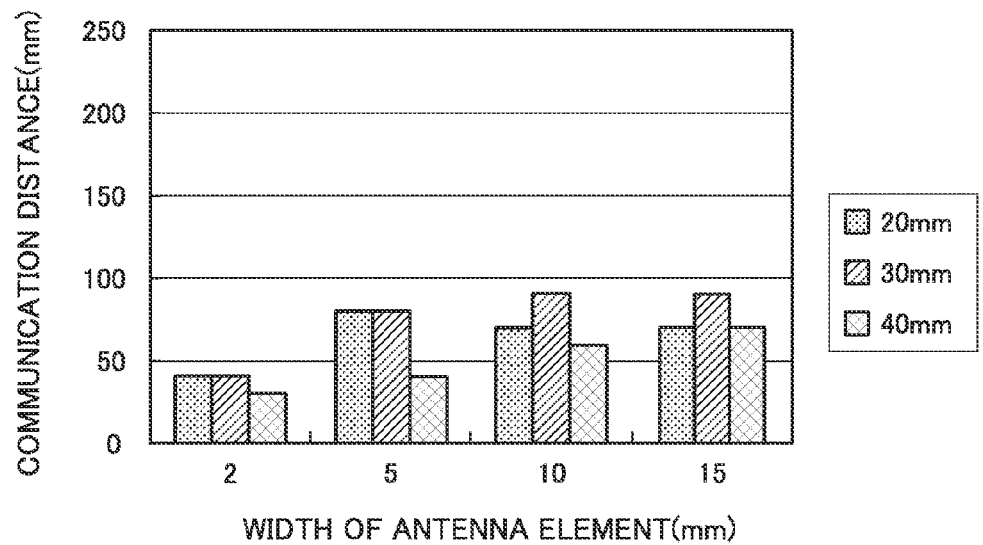
FIG. 9 is a graph illustrating an experiment result when a thickness of a magnetic sheet using a chip strap in which impedance of the circuit portion is small is 200 μm.
Figure 10:
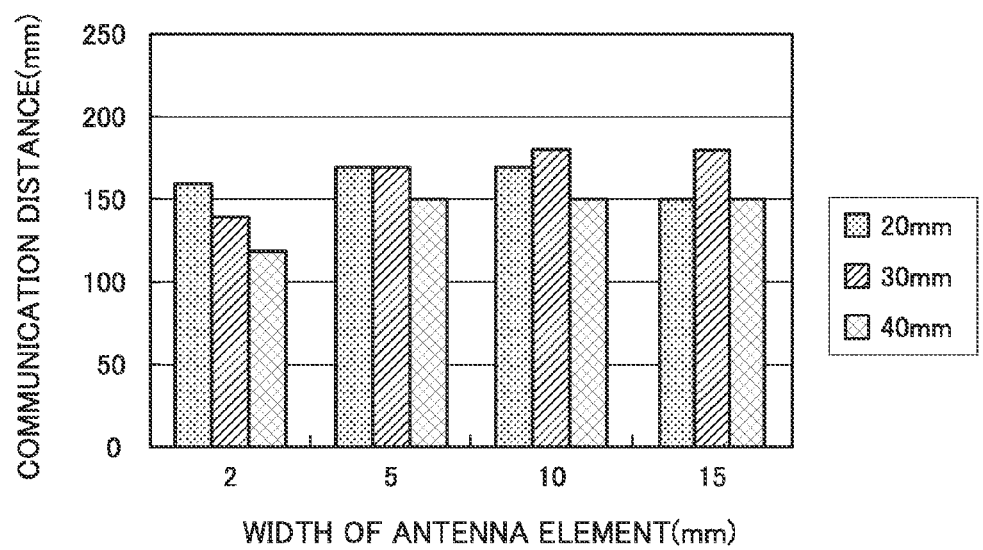
FIG. 10 is a graph illustrating an experiment result when a thickness of a magnetic sheet using a chip strap in which impedance of the circuit portion is small is 400 μm.

Next, experiment results when the chip strap 30 having the circuit portion 31 having a small impedance and resistance value was used and the thickness of the magnetic sheet 10 was 100 μm, 200 μm and 400 μm are shown in FIGS. 8, 9 and 10, respectively.

In a case illustrated in FIG. 8 in which the thickness of the magnetic sheet 10 was 100 μm, information could not be read by the handy reader R at any experimented lengths of the antenna elements 25 and 26 when the widths of the antenna elements 25 and 26 were 2 mm and 5 mm. Meanwhile, when the widths of the antenna elements 25 and 26 were 10 mm and 15 mm, it was found that the communication distance increased as the lengths of the antenna elements 25 and 26 increased.

In a case illustrated in FIG. 9 in which the thickness of the magnetic sheet 10 was 200 μm, generally, a tendency for the communication distance to increase as the widths of the antenna elements 25 and 26 increased was confirmed. In this case, it was also found that the communication distance when the lengths of the antenna elements 25 and 26 were 40 mm is smaller than the communication distance when the lengths were 20 mm and 30 mm.

In each case illustrated in FIG. 10 in which the thickness of the magnetic sheet 10 was 400 μm, a tendency for the communication distance to increase as compared with the case in which the thickness of the magnetic sheet 10 was 200 μm was confirmed. Even in this case, a tendency for the communication distance to increase as the widths of the antenna elements 25 and 26 increased was confirmed. Further, it was found that the communication distance when the lengths of the antenna elements 25 and 26 were 40 mm was smaller than the communication distance when the lengths were 20 mm and 30 mm.

Thus, when compared on condition that the thickness of the magnetic sheet 10 and the widths and lengths of the antenna elements 25 and 26 were the same, the tendency for the communication distance to increase when the chip strap 28 rather than the chip strap 30 was used was confirmed. This is probably due to the fact that impedance matching with the antenna elements 25 and 26 was taken in the chip strap 28 rather than the chip strap 30.

Further, when the thickness of the magnetic sheet 10 ranged from 100 μm to 400 μm, a tendency for the communication distance to increase as the widths of the antenna elements 25 and 26 increased irrespective of the impedance of the circuit portion or the lengths of the antenna elements 25 and 26 was found. It was also confirmed that this tendency was noticeable as the thickness of the magnetic sheet 10 was smaller.

Meanwhile, it was also found that there was a tendency for a communication distance difference according to the lengths of the antenna elements 25 and 26 to be smaller as the thickness of the magnetic sheet 10 increased.

It is known that, in a general RFID tag of a dipole antenna type operating under action of an electric field in the air, the length of the antenna element dominantly affects the communication distance and the width of the antenna element only widens a communication band. It was confirmed that, in contrast thereto, in a layer configuration of the experiment conducted at this time, in relation to influence on the communication distance, communication distance can be greatly enhanced by increasing the width of the antenna element.

Further, it can be considered that in the above experiment, information can be read by the handy reader R, for example, by optimizing the thickness of the magnetic sheet 10 or the widths and lengths of the antenna elements 25 and 26 while adjusting the impedance of the circuit portion even under a condition in which information could not be read by the handy reader R.

As described above, according to the non-contact IC label 1 of the present embodiment, the thickness of the magnetic sheet 10 is set to range from 100 μm to 400 μm, and each of the widths of the antenna elements 25 and 26 is set to range from 2 mm to 15 mm. With such configuration, even when the non-contact IC label 1 is thin and small, communication can be performed between the non-contact IC label 1 and the handy reader R.

Since the nameplate 201 includes the sealing layer 232, liquid, dust, moisture, gas or the like can be prevented from entering the hole portions 231b of the nameplate body 231 and the durability of the communication unit 20 can be improved.

The IC chip 21 is accommodated in the auxiliary hole portion 231f. Accordingly, even when the nameplate body 231 is deformed under force in a thickness direction, a space is easily formed around the IC chip 21, thus reliably protecting the IC chip 21.

Further, communication with the handy reader R can be reliably performed by setting the lengths of the antenna elements 25 and 26 to range from 20 mm to 40 mm.

Since the first direction E1 and the second direction E2 are opposite directions, communication with the handy reader R can be accurately performed.

If the thickness of the magnetic sheet 10 ranges from 100 μm to 400 μm, degradation of the communication distance does not occur as much even when the length of the antenna element of the non-contact IC label 1 is small. Accordingly, the non-contact IC label 1 and the nameplate 201 can be miniaturized in the first direction E1 while maintaining the communication distance. With this miniaturization, it is possible to reduce manufacturing cost of the non-contact IC label 1 and the nameplate 201.

Also, it is possible to construct a small and thin non-contact IC label and nameplate, which is the object of the present invention, by designing the thickness of the magnetic sheet 10 and the widths and lengths of the antenna elements 25 and 26 according to a desired communication distance.

(Experiment 2)

Next, an experiment conducted to investigate a preferred size relationship between the magnetic sheet 10 and the communication unit 20 in the non-contact IC label 1, and a result thereof will be described.

The magnetic sheet 10 is a relatively expensive part. In order to miniaturize the non-contact IC label 1 and reduce manufacturing cost of the non-contact IC label 1, it is desirable for the magnetic sheet 10 to be as small as possible relative to the communication unit 20 of a certain specification in which the widths and lengths of the antenna elements 25 and 26 are defined.

Accordingly, an experiment for confirming effects of a protrusion length L that is a length by which the magnetic sheet 10 protrudes in the interposition direction D with respect to the antenna elements 25 and 26 in a plan view illustrated in FIG. 2, on the communication distance, was conducted.

Further, for example, when antenna elements having a width of 10 mm were used as the antenna elements 25 and 26, the protrusion length L is 13.5 mm according to Equation (1):

$$(50-(10\times2+3))/2 \qquad (1)$$

In the present experiment, the same equipment and materials as those in experiment 1 were used. Further, the chip strap 28 having a great impedance and resistance value was used as the chip strap.

The length in the interposition direction D of the magnetic sheet 10 superimposed on the antenna elements 25 and 26 was adjusted with respect to the antenna elements 25 and 26 of a certain specification to adjust the protrusion length L to be in a range of 0 to 14.5 mm.

Experiment results are shown in FIGS. 11 to 18.

Figure 11:
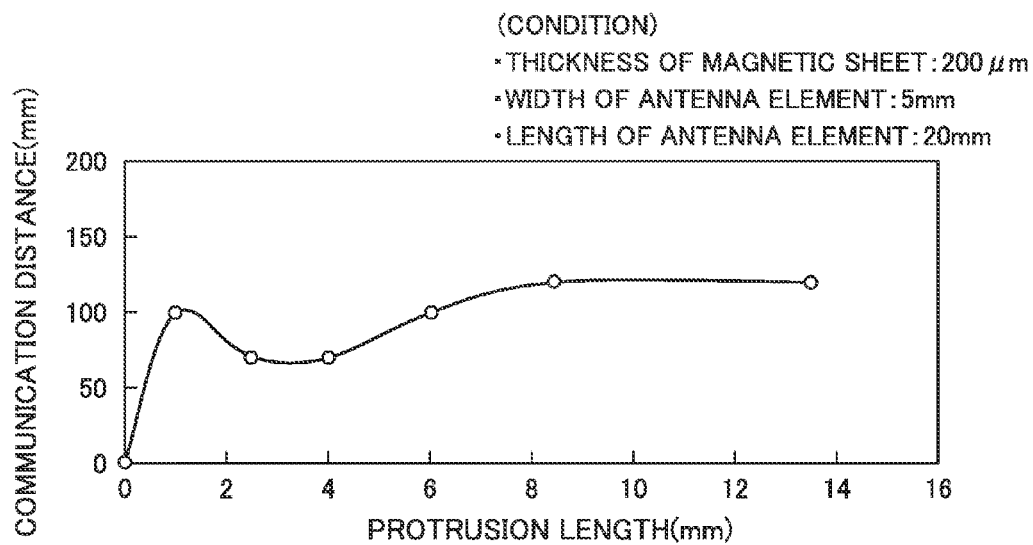
FIG. 11 is a graph illustrating an experiment result of confirming an effect of a protrusion length on a communication distance.
Figure 12:
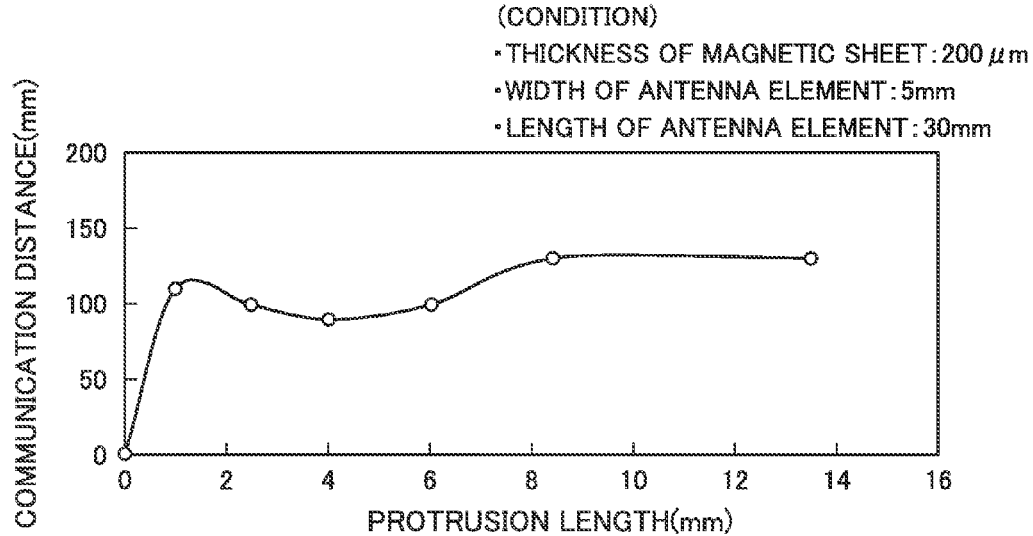
FIG. 12 is a graph illustrating an experiment result of confirming an effect of a protrusion length on a communication distance.
Figure 13:
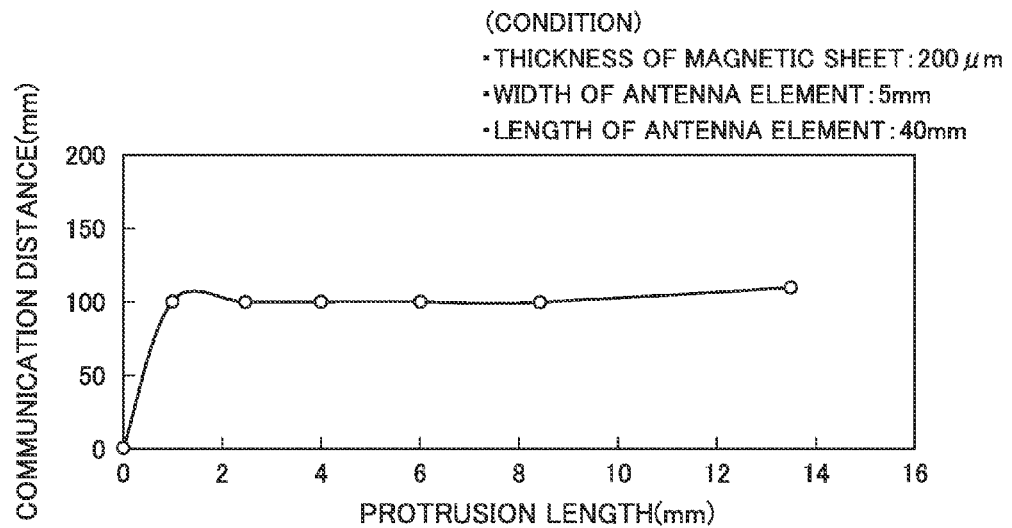
FIG. 13 is a graph illustrating an experiment result of confirming an effect of a protrusion length on a communication distance.
Figure 14:
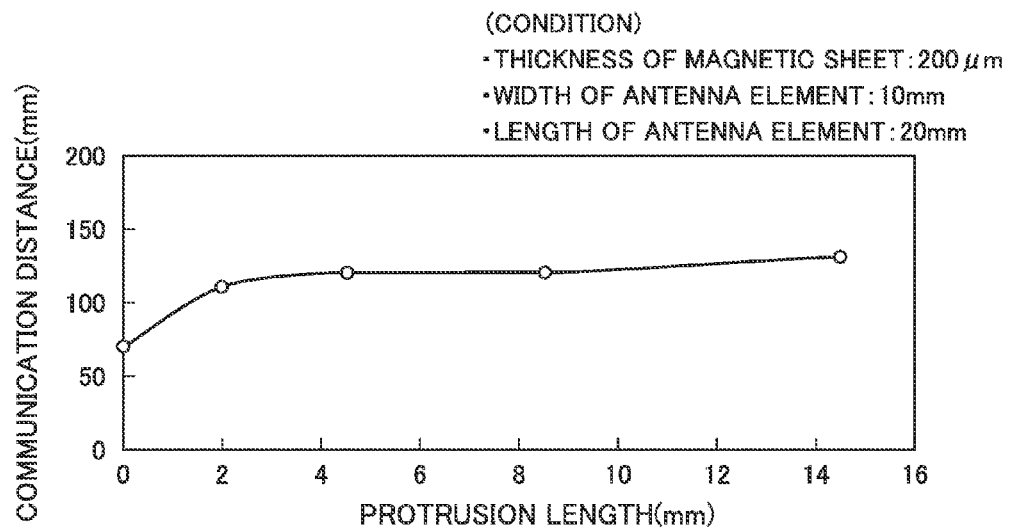
FIG. 14 is a graph illustrating an experiment result of confirming an effect of a protrusion length on a communication distance.
Figure 15:
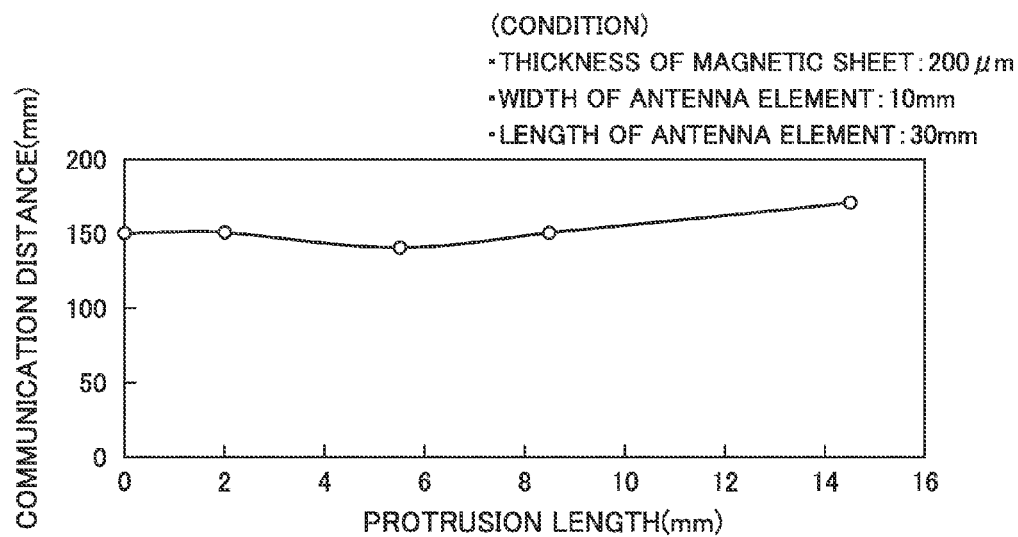
FIG. 15 is a graph illustrating an experiment result of confirming an effect of a protrusion length on a communication distance.
Figure 16:
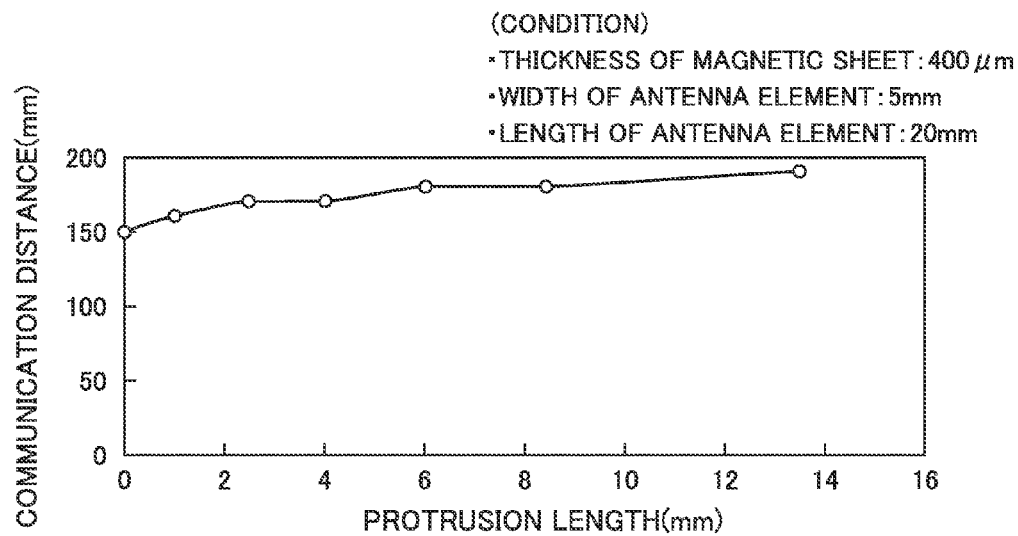
FIG. 16 is a graph illustrating an experiment result of confirming an effect of a protrusion length on a communication distance.
Figure 17:
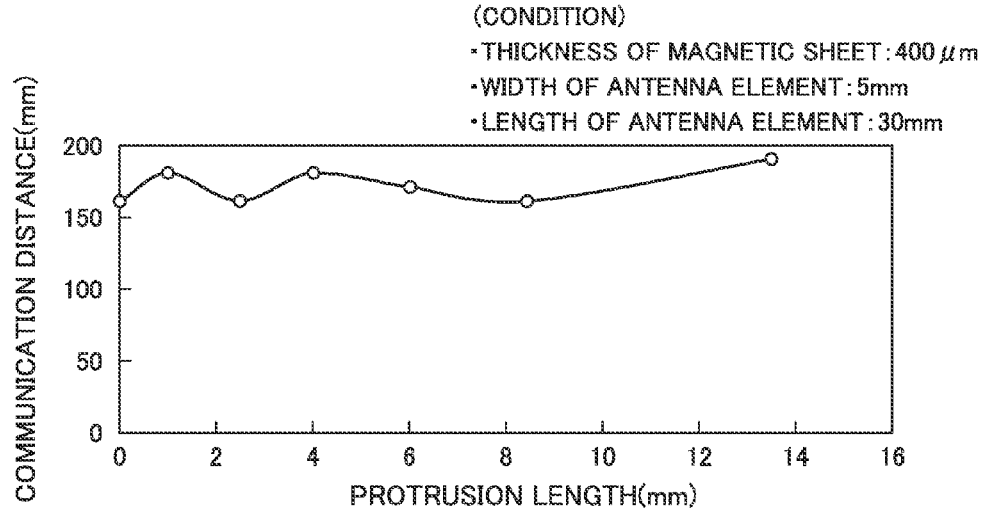
FIG. 17 is a graph illustrating an experiment result of confirming an effect of a protrusion length on a communication distance.
Figure 18:
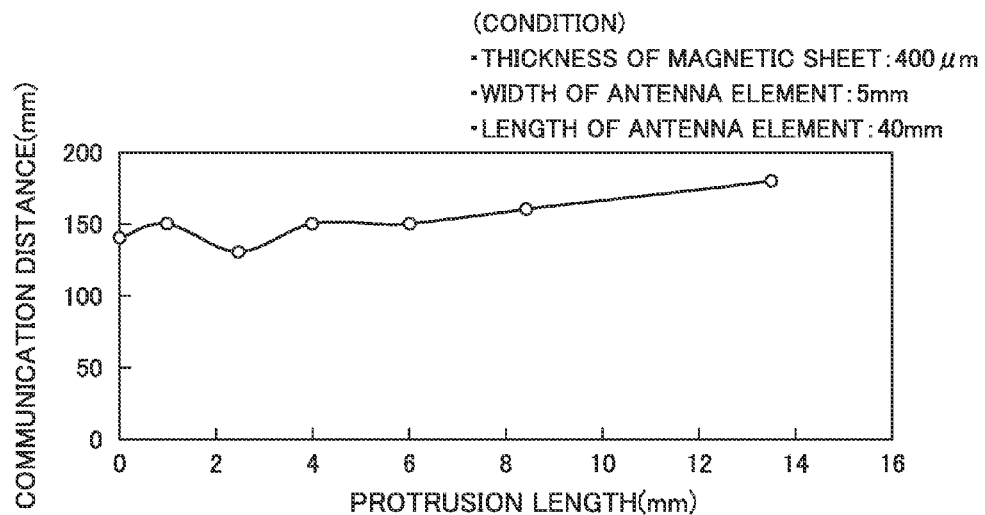
FIG. 18 is a graph illustrating an experiment result of confirming an effect of a protrusion length on a communication distance.

FIGS. 11 to 15 show experiment results when the thickness of the magnetic sheet 10 was 200 μm. FIGS. 16 to 18 show experiment results when the thickness of the magnetic sheet 10 was 400 μm. FIGS. 11 to 13 show experiment results when the widths of the antenna elements 25 and 26 were 5 mm. FIGS. 14 and 15 show experiment results when the widths of the antenna elements 25 and 26 were 10 mm.

As illustrated in FIGS. 11 to 13, it was found that, when the thickness of the magnetic sheet 10 was 200 μm and the widths of the antenna elements 25 and 26 were 5 mm, information could not be read by the handy reader R if the protrusion length L was 0 mm even when the lengths of the antenna elements 25 and 26 were any of 20 mm, 30 mm and 40 mm. It was also confirmed that communication between the chip strap 28 and the handy reader R was possible if the protrusion length L exceeded 1 mm.

Meanwhile, as illustrated in FIGS. 14 and 15, it was found that, when the thickness of the magnetic sheet 10 was 200 μm and the widths of the antenna elements 25 and 26 were 10 mm, the communication was possible even when the protrusion length L was 0 mm.

FIGS. 16 to 18 show experiment results when the widths of the antenna elements 25 and 26 were 5 mm. It was found that, when the thickness of the magnetic sheet 10 was 400 μm, communication was possible even when the widths of the antenna elements 25 and 26 were 5 mm and the protrusion length L was 0 mm.

As described above, communication between the chip strap 28 and the handy reader R can be performed even when the protrusion length L is 0 mm by setting the thickness of the magnetic sheet 10 to range from 200 μm to 400 μm and setting the lengths of the antenna elements 25 and 26 to range from 10 mm to 40 mm.

That is, the length in the interposition direction D of the magnetic sheet 10 relative to a shape of the communication unit 20 can be smaller. Accordingly, it is possible to further reduce manufacturing cost of the non-contact IC label 1 by miniaturizing the non-contact IC label 1 in the interposition direction D and miniaturizing the magnetic sheet 10.

Further, by setting the protrusion length L to 0 mm such that sides in parallel to the first direction E1 of the antenna elements 25 and 26 and the magnetic sheet 10 in a plan view are arranged to overlap each other, the sides can be cut and processed at a time, which facilitates manufacture of the non-contact IC label 1.

Further, in order to examine ranges of the thickness of the magnetic sheet 10 and the widths and lengths of the antenna elements 25 and 26, an experiment that will be described hereinafter was conducted.

(Experiment 3)

In an experiment, equipment and materials shown below were used.

Magnetic sheet 10: μ sheet (product name) HU03 (300 μm thick), which is available from Takeuchi Industrial Co. Ltd.

IC chip 21: UCODE G2iL, which is available from NXP Corporation

Antenna elements 25 and 26: Aluminum thin film having a thickness of 12 μm

Chip strap (with impedance circuit (circuit portion)): Parts other than the IC chip 21 are available from our company Printing a pattern (8 μm thick) with silver paste ink on a film 27 (50 μm thick) formed of PET Reader writer for a 950 MHz band RFID: RF-RW002 (maximum output: 1 W 30 dBm), which is available from Mitsubishi Electric Corporation Antenna for 950 MHz band RFID: RF-ATCP001 (circularly-polarized wave maximum gain: 6 dBi) which is available from Mitsubishi Electric Corporation Fixed attenuator: AT-103 (attenuation amount: 3 dB), which is available from Hirose Electric Co., Ltd.

Metal plate: Formed of stainless (250 mm×250 mm×0.5 mm)

(3-1 Production of Sample)

For a size of the magnetic sheet 10, a length thereof was 125 mm, a width was 45 mm, and thicknesses were 300 μm and 600 μm. Further, for the magnetic sheet having a thickness of 600 μm, two magnetic sheets having a thickness of 300 μm were stacked and used. Further, since making the non-contact IC label thin is the object, a magnetic sheet having a thickness exceeding 600 μm was excluded from experiment targets.

In the antenna elements 25 and 26, widths thereof were changed in three steps of 2 mm, 5 mm and 15 mm, and lengths were changed in four steps of 10 mm, 20 mm, 30 mm and 40 mm. That is, the widths were changed in three steps, and the lengths were changed in four steps, and a total of 12 types of antenna elements 25 and 26 were used.

The connection pads 23 and 24 had square shapes, one side of which was 5 mm, and an interval in the interposition direction D between the connection pad 23 and the connection pad 24 was 6 mm.

(3-2 Experiment Procedure)

Figure 27:
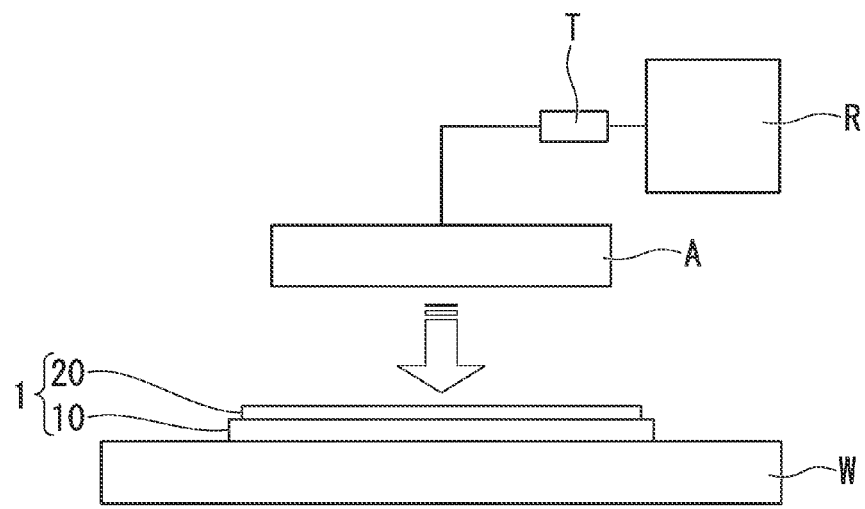
FIG. 27 is a side view illustrating a procedure of an experiment using the non-contact IC label according to the first embodiment of the present invention.

As illustrated in FIG. 27, a magnetic sheet 10 having any of the above thicknesses was arranged on a stainless metal plate W. Also, antenna elements 25 and 26 having any of the above widths and lengths were arranged in the positions illustrated in FIG. 2 on the magnetic sheet 10. Further, the chip strap 28 printed on the film 27 was arranged on the magnetic sheet 10 so that the connection pads 23 and 24 were electrically connected to the antenna elements 25 and 26. A styrene foam, which is not shown, was placed on the film 27, and portions from the metal plate W to the styrene foam were collected and fixed using a band so that connection between the antenna elements 25 and 26 and the connection pads 23 and 24 was reliable.

The IC chip 21 was approached by a reading antenna A from the styrene foam side, and the information stored in the IC chip 21 was read using a radio wave system. Also, a maximum value of a distance (communication distance) at which the reading antenna A could read information from the communication unit 20 in a non-contact manner was obtained.

Further, it was found that the styrene foam and the PET film hardly affected a measurement result of the communication distance.

When the measurement of one specification ended, the band was removed, the antenna elements 25 and 26 interposed between the magnetic sheet 10 and the film 27 were removed, the antenna elements 25 and 26 having a different width or length specification were interposed between the magnetic sheet 10 and the film 27 and fixed using a band, and measurement was conducted.

The widths of the antenna elements 25 and 26 were changed in three steps of 2 mm, 5 mm, and 15 mm, the lengths thereof were changed in four steps of 10 mm, 20 mm, 30 mm and 40 mm, the thickness of the magnetic sheet 10 was changed in two steps of 300 μm and 600 μm, and then the measurement of the communication distance was repeated.

The reader writer R and the reading antenna A used in the experiment were a UHF band, high-output reader writer and antenna capable of reading the present non-contact IC label at a certain communication distance.

A maximum output of the reader writer R was 1 W (30 dBm) but, for convenience of an experimental environment, a fixed attenuator T of −3 dB was connected on a coaxial cable that connected the reader writer R and the reading antenna A to attenuate the output of the reader writer R to 0.5 W (27 dBm), and then the experiment was conducted.

(3-3 Results)

Figure 28:
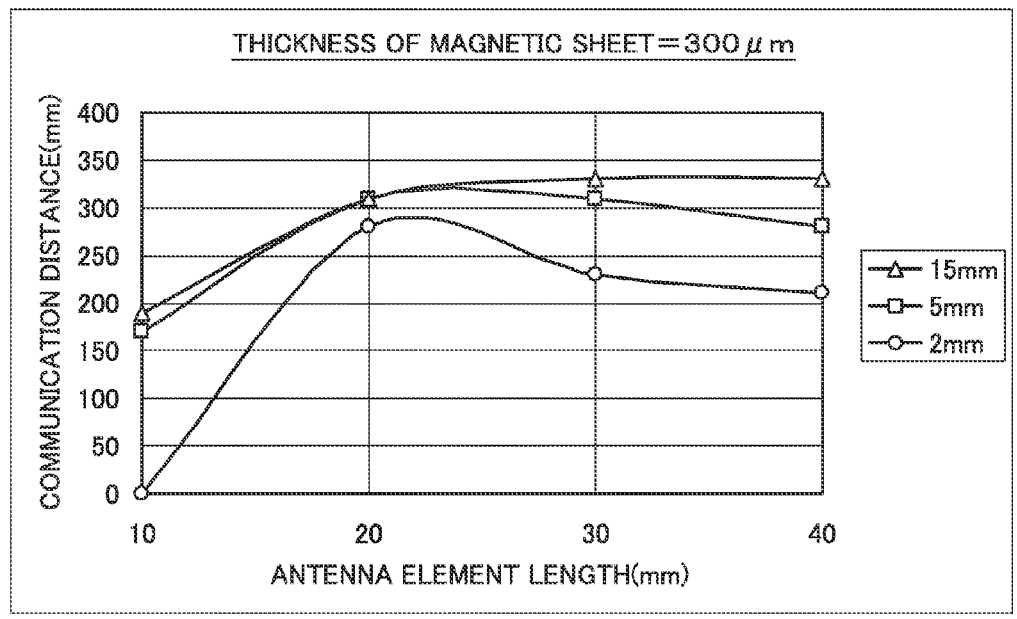
FIG. 28 is a graph illustrating an experiment result when a thickness of a magnetic sheet is 300 μm.
Figure 29:
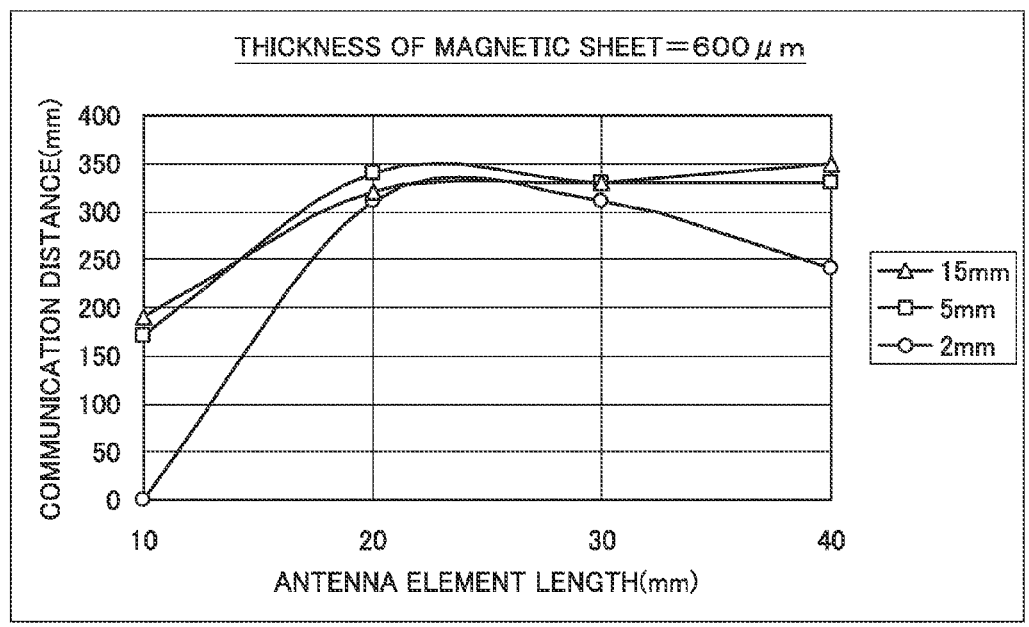
FIG. 29 is a graph illustrating an experiment result when a thickness of a magnetic sheet is 600 μm.

Experiment results when thicknesses of the magnetic sheet 10 were 300 μm and 600 μm are shown in FIGS. 28 and 29, respectively.

In a case in which the thickness of the magnetic sheet 10 was 300 μm as illustrated in FIG. 28, when the widths of the antenna elements 25 and 26 (hereinafter referred to simply as "antenna widths") were 2 mm and lengths thereof (hereinafter referred to simply as "antenna lengths") were 10 mm, information could not be read by the reading antenna A. Further, it was found that, even when the antenna lengths were 20 mm or more, the communication distance was small as compared with antennas having the antenna widths of 5 mm and 15 mm.

When the antenna width was 5 mm, the communication distance was slightly degraded in an area in which the antenna length was 30 mm or more, but it was found that, when the antenna width was 15 mm, the communication distance was not degraded.

In a case in which the thickness of the magnetic sheet 10 was 600 μm as illustrated in FIG. 29, when the antenna width was 2 mm and the antenna length was 10 mm, information could not be read by the reading antenna A, similar to the case in which the thickness of the magnetic sheet 10 was 300 μm.

It was found that, when the antenna length was 20 mm and 30 mm, the same communication distance was obtained with all three of the antenna widths, but when the antenna length was 40 mm, the communication distance was degraded only in the antenna having the antenna width of 2 mm.

When the antenna width was 5 mm, degradation of the communication distance appeared slightly in an area in which the antenna length was 30 mm or more, similar to the case in which the thickness of the magnetic sheet 10 was 300 μm, but the degradation of the communication distance did not appear at the thickness of 600 μm.

It was found that, when the antenna width was 15 mm, the communication distance was not degraded, similar to the case in which the thickness of the magnetic sheet 10 was 300 μm.

It is known that, in a general RFID tag of a half-wavelength dipole antenna type operating under action of an electric field in the air, the length of the antenna element dominantly affects the communication distance and the width of the antenna element only widens a communication band. It was confirmed that, in contrast thereto, in a layer configuration of the experiment conducted at this time, an element of the width of the antenna element greatly affected the communication distance and the communication distance could be enhanced by increasing the width of the antenna element.

Further, in the experiment result, the best value of the communication distance was 350 mm (magnetic sheet thickness=600 μm, antenna width=15 mm, and antenna length=40 mm), but it is understand that the communication distance further increases since the output of the reading device is raised up to a maximum of 1 W (30 dBm) when actually used.

Further, the communication distance can be considered to be further improved by setting electrical physical property values (permeability, magnetic loss, permittivity, dielectric loss, etc.) of the magnetic sheet 10 to preferred physical property values and optimizing the impedance of the circuit portion, the thickness of the magnetic sheet 10, and the widths and lengths of the antenna elements 25 and 26.

As described above, according to the non-contact IC label 1 of the present embodiment, the thickness of the magnetic sheet 10 is set to range from 300 μm to 600 μm, and each of the widths of the antenna elements 25 and 26 is set to range from 5 mm to 15 mm. With this configuration, communication between the non-contact IC label 1 and the data reading device can be performed even when the non-contact IC label 1 is thin.

Further, the communication between the non-contact IC label 1 and the data reading device can be reliably performed by setting the lengths of the antenna elements 25 and 26 to be in a range from 10 mm to 40 mm.

Further, the communication between the non-contact IC label 1 and the data reading device can be also performed by setting the widths of the antenna elements 25 and 26 to be in a range from 2 mm to 15 mm when the lengths of the antenna elements 25 and 26 are set to be in a range from 20 mm to 40 mm.

If the thickness of the magnetic sheet 10 is 300 μm or more and the widths of the antenna elements 25 and 26 are 5 mm or more, even when the length of the antenna element of the non-contact IC label 1 is small, significant degradation of the communication distance does not occur as much. Accordingly, it is possible to miniaturize the non-contact IC label 1 in the first direction E1 while maintaining the communication distance to some extent. This miniaturization can lead to reduced manufacturing cost of the non-contact IC label 1.

Meanwhile, although it does not reduce the manufacturing cost, the communication distance can be somewhat enhanced by increasing the length of the antenna element of the non-contact IC label 1. Further, a greater communication distance is likely to be obtained by changing the electrical physical property values (permeability, magnetic loss, permittivity, dielectric loss, etc.) of the magnetic sheet 10 as described above and by making the length of the antenna element much greater (40 mm or more). (The length of the antenna element≈the communication distance.)

Thus, it is possible to construct a thin non-contact IC label, which is the object of the present invention, by designing the thickness of the magnetic sheet 10 and the widths and lengths of the antenna elements 25 and 26 according to a desired communication distance.

While the embodiment of the present invention has been described above in detail with reference to the accompanying drawings, a concrete configuration is not limited to this embodiment and includes modifications of the configuration without departing from the scope of the present invention. Further, it is understood that the respective configurations shown in each embodiment can be appropriately combined and used.

For example, in the above embodiment, the shapes of the antenna elements 25 and 26, when viewed in a plan view, are rectangular shapes. However, the shape of the antenna element is not limited thereto, and if the width of the antenna element is set to be in a range of from 2 mm to 15 mm, the shape when viewed in a plan view may be a circular shape, an elliptical shape, a polygonal shape, or the like. Further, the first antenna element 25 and the second antenna element 26 may have different shapes.

Further, in the above embodiment, the antenna elements 25 and 26 are arranged so that the first direction E1 in which the first antenna element 25 extends and the second direction E2 in which the second antenna element 26 extends are opposite directions. However, an arrangement of the antenna elements 25 and 26 is not particularly limited as long as the antenna elements 25 and 26 are arranged so that the first direction E1 and the second direction E2 are not the same directions but different directions.

In the above embodiment, the communication unit 20 is arranged in one surface 10a of the magnetic sheet 10. However, a member formed of, for example, resin may be arranged between the one surface 10a of the magnetic sheet 10 and the communication unit 20 or an air layer may be provided between the one surface 10a of the magnetic sheet 10 and the communication unit 20.

Further, although not shown, when the non-contact IC label is actually used, a film or a paper having information of characters, figures or the like for visual inspection or machine-reading described thereon, which also protects the IC chip, may be provided on an opposite side to the magnetic sheet relative to the communication unit. Further, this information may be described in a film by, for example, a printer after the film is provided in the non-contact IC label. Further, an adhesion layer for being attached to a metal surface that is the adherend may be provided on the other surface of the magnetic sheet.

Second Embodiment

Next, a second embodiment of the present invention will be described with reference to FIGS. 24 to 26, but the same reference numerals are assigned to the same parts as those of the above-described embodiment, description of the same parts will be omitted and only differences therebetween will be described.

Figure 24:
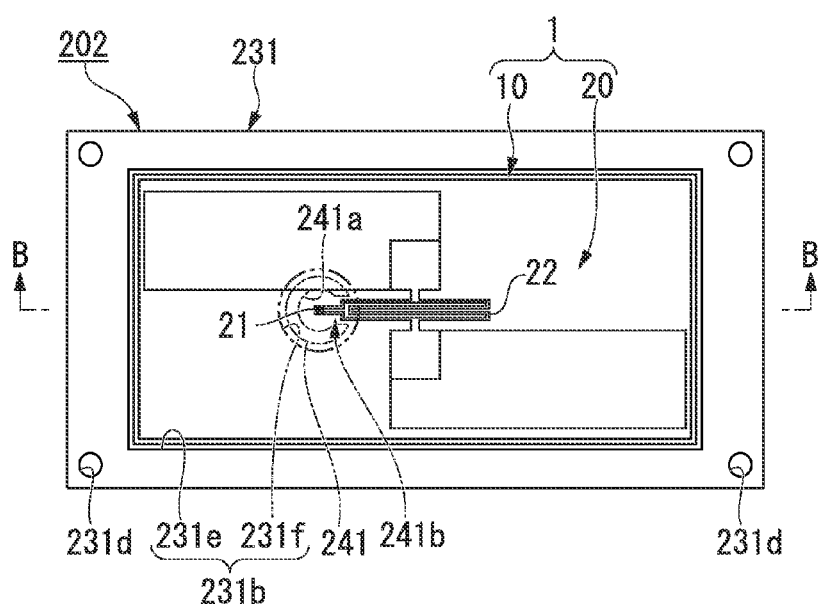
FIG. 24 is a perspective plan view of a nameplate according to a second embodiment of the present invention.
Figure 25:
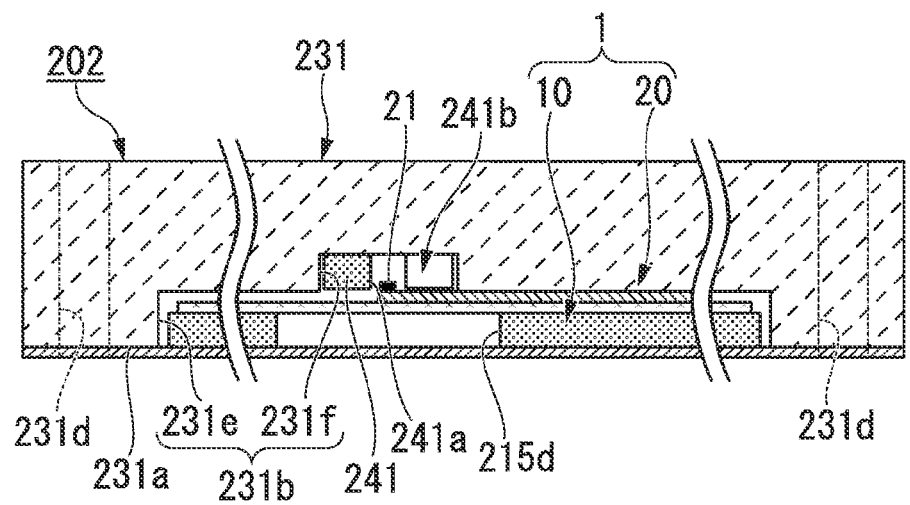
FIG. 25 is cross-sectional view taken along cutting line B-B in FIG. 24.

As illustrated in FIGS. 24 and 25, a nameplate 202 of the present embodiment includes a chip protection ring (protection member) 241 that is formed in a ring shape, is accommodated in an auxiliary hole portion 231f of the nameplate body 231, and has an IC chip 21 accommodated in its through hole 241a, in addition to each configuration of the nameplate 201 of the first embodiment. An interference prevention hole 215d is formed in a magnetic sheet 10.

The interference prevention hole 215d of the magnetic sheet 10 is formed wider than a portion overlapping the chip protection ring 241 in the magnetic sheet 10, when viewed in a thickness direction of the magnetic sheet 10.

A communicating portion 241b that communicates with the through hole 241a and has an opening in the outer peripheral surface of the chip protection ring 241 is formed in the chip protection ring 241. The IC chip 21 is arranged at a center of the through hole 241a of the chip protection ring 241. For example, when a thickness of the IC chip 21 is approximately 75 the thickness of the chip protection ring 241 is set to approximately 200 μm. A material of the chip protection ring 241 is not limited as long as the material has hardness above hardness of a material of the nameplate body 231 and can be formed in a ring shape, and any material, whether metal or non-metal may be used.

A part of the circuit portion 22 is arranged within the communicating portion 241b of the chip protection ring 241.

According to the nameplate 202 of the present embodiment configured above, the nameplate 202 can perform communication even when attached to the metallic adherend, and can be formed to be thin and small.

Further, since the chip protection ring 241 is included, the IC chip 21 can be prevented from being damaged or short-circuited when the nameplate body 231 is subjected to a strong force (for example, tapped by a metal hammer). Since the thickness of the nameplate 202 is as small as approximately 1 mm, the nameplate body 231 is easily deformed and the IC chip 21 may be moved to the sealing layer 232, particularly, when a force is applied to the second surface 231c of the nameplate body 231. In the present embodiment, since the chip protection ring 241 is included and the thickness of the chip protection ring 241 is set to 2.5 times or more that of the IC chip 21, the IC chip 21 is not damaged as long as the IC chip 21 is not subjected to a strong force causing the thickness of the chip protection ring 241 to collapse up to approximately 75 μm.

Since a part of the circuit portion 22 is arranged within the communicating portion 241b of the chip protection ring 241, the circuit portion 22 can be prevented from being damaged even when the nameplate body 231 is subjected to a strong force.

Also, since the interference prevention hole 215d is formed in the magnetic sheet 10, the IC chip 21 can be prevented from being damaged or short-circuited under a force from the magnetic sheet 10, for example, even when the second surface 231c of the nameplate body 231 is subjected to a force and the IC chip 21 and the chip protection ring 241 are moved to a position of the magnetic sheet 10 in a thickness direction of the nameplate body 231.

Further, according to the nameplate 202 of the present embodiment, the nameplate 202 can perform communication even when attached to the metallic adherend such as a facility, a device, or a part, and increase weather resistance, durability, and shock resistance, thus reliably conserving a display W described on a display surface of the nameplate body 231 for a long period of time.

Figure 26:
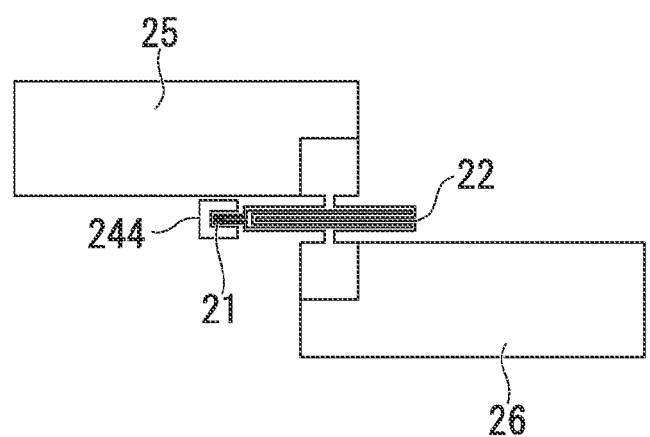
FIG. 26 is a plan view of a chip protection ring of a nameplate according to a variant of the second embodiment of the present invention.

Further, in the present embodiment, a shape of the chip protection ring may be a rectangular shape or a polygonal shape other than the rectangular shape, like the chip protection ring 244 illustrated in FIG. 26, as long as a through hole for accommodating the IC chip 21 can be formed.

Further, while in the present embodiment, the chip protection ring 241 is accommodated in the auxiliary hole portion 231f, the chip protection ring 241 may be accommodated in the hole-portion body 231e.

While the first and second embodiments of the present invention have been described in detail with reference to the accompanying drawings, a concrete configuration is not limited to the embodiments and includes modifications of the configuration without departing from the scope of the present invention. Further, it is understood that the respective configurations shown in each embodiment can be appropriately combined and used.

For example, in the first embodiment and the second embodiment, an adhesive layer may be provided on the first surface 231a of the nameplate body 231 and the nameplate body 231 may be fixed to the adherend by the adhesive layer, instead of providing the attachment hole 231d in the nameplate body 231.

Further, when humidity or moisture is less in an environment in which the nameplate is used, the sealing layer 232 may not be included.

Third Embodiment

Next, a third embodiment of the present invention will be described with reference to FIGS. 30 and 31.

Hereinafter, a non-contact IC label 401 according to an embodiment of the present invention will be described with reference to FIGS. 30 and 31. The non-contact IC label 401 has ID information, and performs communication with a data reading device R in a non-contact manner with respect to the ID information.

The non-contact IC label 401 includes a base 419, a first antenna portion 412, a second antenna portion 413 and an IC chip 414 provided in one surface of the base 419, a circuit portion (connection portion) 415 connecting the first antenna portion 412, the second antenna portion 413 and the IC chip 414, and a rectangular magnetic sheet 411 adhered via a first adhesion layer 416 to cover such components.

Further, in the present embodiment, the magnetic sheet 411 includes a hole portion 421 provided in a position corresponding to the IC chip 414, and includes a protection member 418 accommodated in the hole portion 421 and protecting the IC chip 414.

Here, a transverse direction of the magnetic sheet 411 is referred to as a first direction D, and a longitudinal direction thereof is referred to as a second direction E.

The base 419 is a film-shaped member formed of a resin such as PET.

Figure 30:
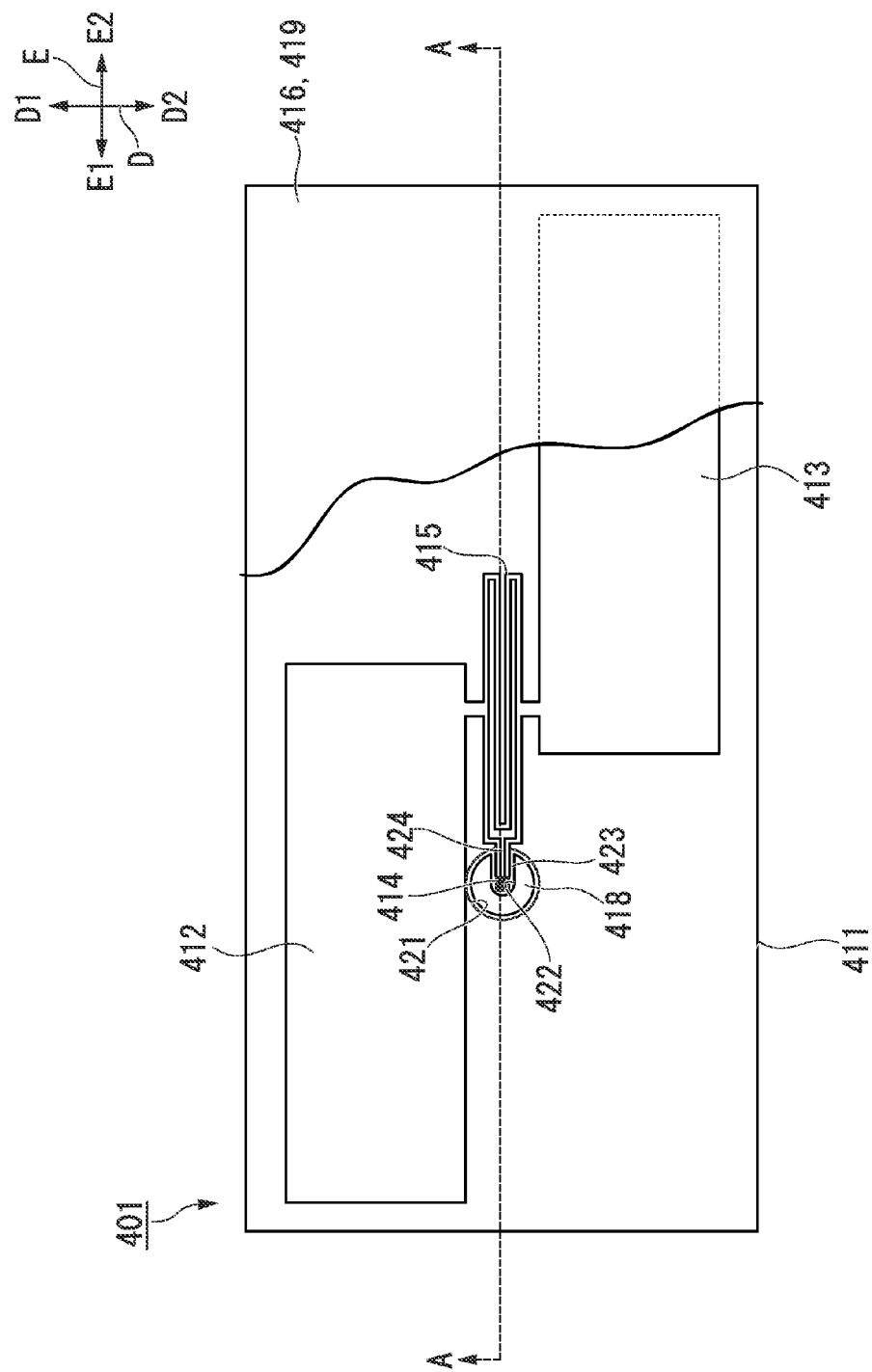
FIG. 30 is a plan view schematically illustrating a non-contact IC label according to a third embodiment of the present invention.
Figure 31:
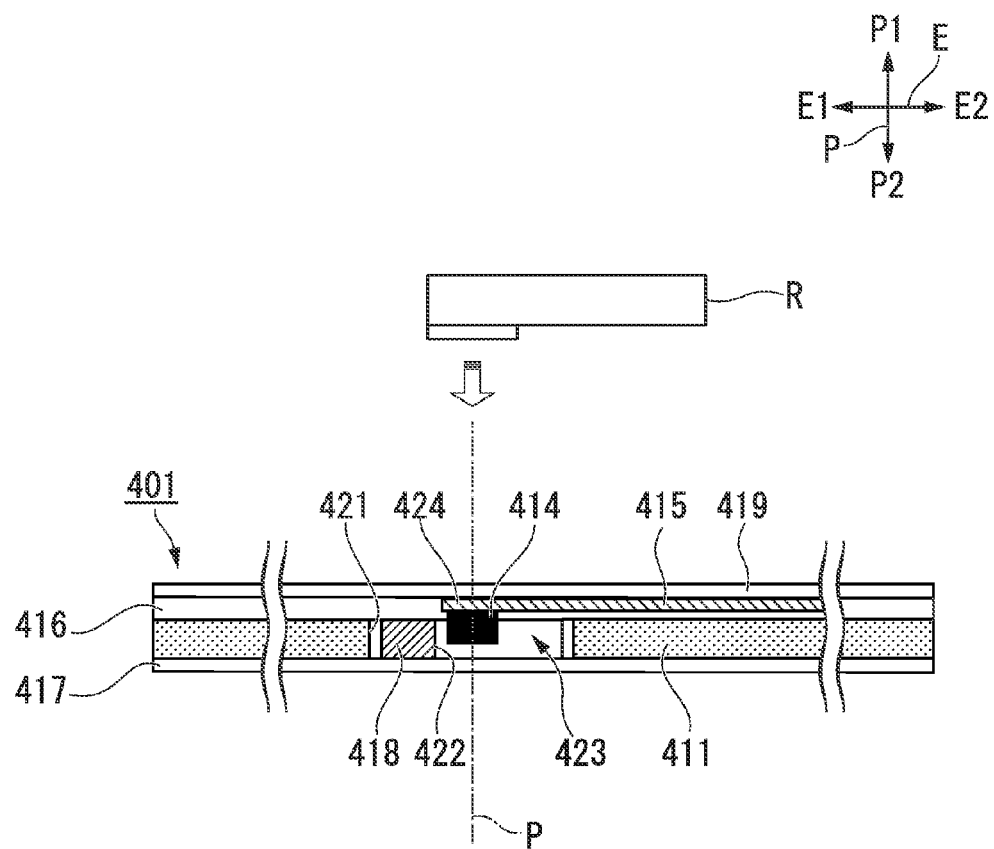
FIG. 31 is a cross-sectional view of the non-contact IC label according to the third embodiment, and a view illustrating a cross-section taken along line A-A of FIG. 30.

The first antenna portion 412 is a rectangular member arranged on the one surface of the base 419, electrically connected to the circuit portion 415 near a center of the base 419, and extending from a vicinity of this center to one side D1 in a first direction (an upper side in FIG. 1) and one side E1 in a second direction (a left side in FIG. 30). Also, the first antenna portion 412 performs transmission and reception of radio waves with the data reading device R, and is integrally provided with the base 419 by printing silver paste ink on the one surface of the base 419.

The second antenna portion 413 is a member arranged on the one surface of the base 419 and electrically connected to the circuit portion 415 near the center of the base 419, similar to the first antenna portion 412. Also, the second antenna portion 413 has a rectangular shape extending from the vicinity of the center to the other side D2 in the first direction (a lower side in FIG. 1) and the other side E2 in the second direction (a right side in FIG. 1).

Accordingly, the first antenna portion 412 and the second antenna portion 413 are arranged in diagonal positions with the circuit portion 415 interposed therebetween in the one surface of the base 419. Further, the second antenna portion 413 is integrally provided with the base 419 by printing silver paste ink on one surface of the base 419, similar to the first antenna portion 412.

The IC chip 414 is a known electronic part arranged on the one surface of the base 419 and delivering stored information from an electric junction, which is not shown, to the outside as radio waves by supplying energy of radio waves from the electric junction using a radio wave system. Further, the IC chip 414 is connected to the first antenna portion 412 and the second antenna portion 413 via the circuit portion 415 electrically connected to the electric junction, which is not shown. Here, in the present embodiment, the IC chip 414 has a thickness of approximately 75 nm in a direction perpendicular to the first direction D and the second direction E.

The circuit portion 415 is formed of a wiring meandering in a predetermined shape, and a shape of the circuit portion 415 is a substantially rectangular shape whose transverse direction is the first direction D and whose longitudinal direction is the second direction E. Further, the circuit portion 415 includes a convex portion 424, which protrudes toward one side E1 of the second direction, in an end portion at the one side E1 of the second direction.

Further, the circuit portion 415 is arranged to be interposed in the first direction D between the first antenna portion 412 and the second antenna portion 413, and is electrically connected, in the convex portion 424, to the electric junction, which is not shown, of the IC chip 414. Also, this circuit portion 415 is an impedance matching circuit configured to have an inductance value and a resistance value for matching internal impedance of the IC chip 414 with antenna impedance of the first antenna portion 412 and the second antenna portion 413.

Further, the circuit portion 415 is integrally provided with the base 419 by printing silver paste ink on the one surface of the base 419, similar to the first antenna portion 412, the second antenna portion 413, and the IC chip 414.

The magnetic sheet 411 is a member of a known material, such as a compound material of magnetic particles or magnetic flakes and plastic or rubber, and has a rectangular shape. Also, this magnetic sheet 411 has lengths in a transverse direction and a longitudinal direction coincident with those of the base 419, and is adhered to the base 419 via the first adhesion layer 416 to cover the first antenna portion 412, the second antenna portion 413, the IC chip 414, and the circuit portion 415 (connection portion).

Further, a second adhesion layer 417 for fixing the non-contact IC label 401 to the adherend, such as a product, is provided on a surface opposite to a surface of the magnetic sheet 411 in which the first adhesion layer 416 is provided.

Next, the hole portion 421 and the protection member 418 formed in the magnetic sheet 411 will be described.

The hole portion 421 passes through the magnetic sheet 411 in a direction perpendicular to the first direction D and the second direction E, that is, the thickness direction of the magnetic sheet 411, and is formed in a position exactly corresponding to the IC chip 414 when the magnetic sheet 411 is adhered to the base 419.

The protection member 418 is a ring-shaped member formed of a material that is harder than the IC chip 414 and has strength to withstand assumed external stress and shock. Also, a thickness in the thickness direction of the magnetic sheet 411, that is, an axis line direction P, of the protection member 418 is substantially equal to that of the magnetic sheet 411, and is greater than a thickness (75 μm) in the axis line direction P, of the IC chip 414.

Further, a through hole 422 passing through in the axis line direction P is formed in the protection member 418, and a communicating portion 423 communicating with the through hole 422 and opened in an outer peripheral surface at the other side E2 of the second direction of the protection member 418 is formed. Further, this communicating portion 423 is formed from a surface directed to one side P1 (an upper side in FIG. 31) of the axis line direction of the protection member 418 to a surface directed to the other side P2 (a lower side in FIG. 31) of the axis line direction. That is, a cross-section of the protection member 418 has a C shape, when viewed from the other side P2 of the axis line direction and the one side P1 of the axis line direction. That is, the communicating portion 423 includes a through portion formed along the axis line direction of the protection member 418.

While the IC chip 414 is accommodated in the through hole 422 of the protection member 418 when the magnetic sheet 411 is adhered, a part of the IC chip 414 is arranged to protrude from the protection member 418 to the one side P1 of the axis line direction.

Further, the convex portion 424 of the circuit portion 415 is connected from the one side P1 of the axis line direction and is arranged within the communicating portion 423 when viewed from the one side P1 of the axis line direction.

According to the non-contact IC label 401 as described above, as the silver paste ink is printed on the base 419, the first antenna portion 412, the second antenna portion 413, the IC chip 414, and the circuit portion 415 are formed to be thin, and a structure of a so-called dipole antenna is formed. Further, as the magnetic sheet 411 is adhered, it is possible to perform transmission and reception of radio waves to and from the data reading device R illustrated in FIG. 31 to read information of the IC chip 414 while maintaining the thin form.

Here, the non-contact IC label 401 is adhered to the adherend such as a product via the second adhesion layer 417, but when the adherend is thin and is metal rather than an elastic material, the adherend cannot absorb external shock.

In this regard, the non-contact IC label 401 of the present embodiment has substantially the same thickness as the magnetic sheet 411 and includes the protection member 418 thicker in the axis line direction P than the IC chip 414. Accordingly, when the non-contact IC label 401 is subjected to an impulsive force from the one side P1 of the axis line direction, that is, a direction of the data reading device R of FIG. 31, the IC chip 414 and the convex portion 424 of the circuit portion 415 enter the protection member 418 to be completely accommodated in the protection member 418. Accordingly, the impulsive force acts on only the protection member 418 and does not act on the IC chip 414 and the convex portion 424 of the circuit portion 415.

Accordingly, it is possible to protect the IC chip 414 and the convex portion 424 of the circuit portion 415 while realizing the thin non-contact IC label 401, thus avoiding damage of the IC chip 414 and rupture of the circuit portion 415 due to the impulsive force.

In the non-contact IC label 401 according to the present embodiment, when an impulsive force acts on the non-contact IC label 401 from the one side P1 of the axis line direction, the IC chip 414 and the convex portion 424 of the circuit portion 415 enter the protection member 418. Thus, the impulsive force is caused to act on the protection member 418 such that the IC chip 414 and the circuit portion 415 can be protected. Further, it is possible to protect the IC chip 414 and the circuit portion 415, to have a thin shape since the thickness of the protection member 418 is substantially equal to that of the magnetic sheet 411, and to maintain a state in which communication can be performed.

While the embodiment of the present invention has been described in detail with reference to the accompanying drawings, a concrete configuration is not limited to the present embodiment and includes modifications of the configuration without departing from the scope of the present invention.

For example, the protection member 418 can be formed in a ring shape. For example, a material that can withstand an assumed impulsive force causing the data reading device R to be in contact may be used, and various materials, whether metal or non-metal, may be used.

Further, the shape of the protection member 418 is not limited to the shape in the present embodiment and may be, for example, a rectangular shape or a polygonal shape.

Further, while in the present embodiment, the first antenna portion 412, the second antenna portion 413 and the circuit portion 415 are integrally provided with the base 419 by printing the silver paste ink on the base 419, the first antenna portion 412, the second antenna portion 413 and the circuit portion 415 may be formed on a surface of the base 419 by etching a thin film of aluminum, copper, or the like.

Further, the shapes of the first antenna portion 412 and the second antenna portion 413 are not limited to the shapes of the present embodiment and may be, for example, circular shapes, elliptical shapes, or polygonal shapes, when viewed from the one side P1 of the axis line direction. Further, the shapes of the first antenna portion 412 and the second antenna portion 413 may differ.

Also, the first antenna portion 412 and the second antenna portion 413 may be arranged in different directions of the second direction E and are not limited to the arrangement of the present embodiment. Specifically, the circuit portion 415 may be arranged to be interposed from the second direction E.

Also, a resin member or an air layer may be provided between the magnetic sheet 411 and the first antenna portion 412 and the second antenna portion 413.

Further, when the non-contact IC label 401 is actually used, information of characters, figures or the like for visual inspection or machine-reading may be described on the base 419. Further, a film or a paper having the information described thereon may be provided on the base 419 or the information may be described by using, for example, a printer.

What is claimed is:

1. A non-contact IC label comprising:
a magnetic sheet having a long side along a first direction and along a second direction opposite to the first direction, and having a short side along a third direction perpendicular to the first direction and along a fourth direction opposite to the third direction;
an IC chip arranged on the magnetic sheet;
a circuit portion extending in the second direction from the IC chip;
a first connection portion being adjacent to the IC chip and extending in the third direction from the circuit portion;
a second connection portion being adjacent to the IC chip and extending in the fourth direction from the circuit portion;
a first antenna portion including the first connection portion and arranged on the magnetic sheet to extend in the first direction and the third direction from the first connection portion; and
a second antenna portion including the second connection portion and arranged on the magnetic sheet to extend in the second direction and the fourth direction from the second connection portion, wherein
each of a length of the first antenna portion in the third direction and a length of the second antenna portion in the fourth direction is 2 mm to 15 mm, and
the first antenna portion, the first connection portion, the circuit portion, the second connection portion, and the second antenna portion are arranged in sequential order along the fourth direction.

2. The non-contact IC label according to claim 1, wherein:
a thickness of the magnetic sheet ranges from 100 μm to 400 μm.

3. The non-contact IC label according to claim 2, wherein:
each of the length of the first antenna portion in the first direction and the length of the second antenna portion in the second direction ranges from 20 mm to 40 mm.

4. The non-contact IC label according to claim 2, wherein:
a thickness of the magnetic sheet is 200 μm or more, and
each of the length of the first antenna portion in the third direction and the length of the second antenna portion in the fourth direction is 10 mm or more.

5. The non-contact IC label according to claim 1, wherein:
a thickness of the magnetic sheet ranges from 300 μm to 600 μm.

6. The non-contact IC label according to claim 5, wherein:
each of the length of the first antenna portion in the third direction and the length of the second antenna portion in the fourth direction is 5 mm to 15 mm.

7. The non-contact IC label according to claim 6, wherein:
each of the length of the first antenna portion in the first direction and the length of the second antenna portion in the second direction ranges from 10 mm to 40 mm.

8. The non-contact IC label according to claim 5, wherein:
each of the length of the first antenna portion in the first direction and the length of the second antenna portion in the second direction ranges from 20 mm to 40 mm.

9. The non-contact IC label according to claim 5, wherein:
a thickness of the magnetic sheet is 300 µm or more, and
each of the length of the first antenna portion in the third direction and the length of the second antenna portion in the fourth direction is 5 mm or more.

10. The non-contact IC label according to claim 4, wherein:
the non-contact IC label performs communication with a data reading device by using a radio wave system as a communication system.

11. A nameplate comprising:
a non-contact IC label according to claim 4; and
a sheet-shaped body portion including a first surface having a hole portion formed therein, the hole portion accommodating the non-contact IC label, and a display surface formed in a second surface opposite to the first surface.

12. The nameplate according to claim 11, further comprising:
a lid portion that is attached to the first surface of the body portion and seals the hole portion in a watertight manner.

13. The nameplate according to claim 11, wherein:
the hole portion includes:
a main hole portion formed in the first surface of the body portion; and
an auxiliary hole portion that is formed in a bottom portion of the main hole portion and communicates with the main hole portion, and
the IC chip is accommodated within the auxiliary hole portion.

14. The nameplate according to claim 13, further comprising:
a protection member that includes a through hole formed to accommodate the IC chip and is accommodated in the auxiliary hole portion.

15. The nameplate according to claim 14, wherein:
the protection member is formed in a ring shape,
a communicating portion communicating with the through hole and having an opening in an outer peripheral surface of the protection member is formed in the protection member, and
the connection portion is arranged within the communicating portion.

16. The nameplate according to claim 14, wherein:
an interference prevention hole is formed in a portion overlapping the protection member in the magnetic sheet when viewed in a thickness direction of the magnetic sheet.

17. The nameplate according to claim 11, wherein:
a radio wave system is used as a communication system between the non-contact IC label and a data reading device.

* * * * *